(12) United States Patent
Svensson et al.

(10) Patent No.: US 12,055,969 B2
(45) Date of Patent: Aug. 6, 2024

(54) FRAME FOR A TOUCH-SENSITIVE DEVICE AND TOOL THEREFOR

(71) Applicant: FlatFrog Laboratories AB, Lund (SE)

(72) Inventors: Patrik Svensson, Hjarup (SE); Tobias Wiesel, Bjarred (SE); Johan Westlund, Lund (SE); Håkan Bergström, Torna-Hällestad (SE)

(73) Assignee: FlatFrog Laboratories AB, Lund (SE)

( * ) Notice: Subject to any disclaimer, the term of this patent is extended or adjusted under 35 U.S.C. 154(b) by 633 days.

(21) Appl. No.: 17/274,132

(22) PCT Filed: Oct. 2, 2019

(86) PCT No.: PCT/SE2019/050953
§ 371 (c)(1),
(2) Date: Mar. 5, 2021

(87) PCT Pub. No.: WO2020/080992
PCT Pub. Date: Apr. 23, 2020

(65) Prior Publication Data
US 2021/0255662 A1 Aug. 19, 2021

(30) Foreign Application Priority Data
Oct. 20, 2018 (SE) .................... 1830301-6

(51) Int. Cl.
G06F 1/16 (2006.01)
G02B 5/02 (2006.01)
G06F 3/042 (2006.01)

(52) U.S. Cl.
CPC ......... *G06F 1/1601* (2013.01); *G02B 5/0268* (2013.01); *G06F 3/0421* (2013.01); G06F 2203/04103 (2013.01)

(58) Field of Classification Search
CPC ....... G02B 5/02; G02B 5/0268; G06F 1/1601; G06F 1/1643; G06F 1/1684; G06F 1/169;
(Continued)

(56) References Cited

U.S. PATENT DOCUMENTS 3,375,053 A 3/1968 Ward
3,440,426 A 4/1969 Bush
(Continued)

FOREIGN PATENT DOCUMENTS

AU 2008280952 A1 3/2009
AU 2014201966 A1 4/2014
(Continued)

OTHER PUBLICATIONS

International Search Report for International App. No. PCT/SE2019/050953, dated Nov. 26, 2019, in 4 pages.
(Continued)

Primary Examiner — Dmitriy Bolotin
(74) Attorney, Agent, or Firm — Knobbe, Martens, Olson, & Bear, LLP

(57) ABSTRACT

An elongate frame for a touch-sensitive device comprises: a bottom wall, a top wall and a side wall connected therebetween. The elongate frame also comprises a first mounting and a second mounting for respectively fixing at least one light emitter and a touch surface with respect to the frame. The elongate frame also comprises a slot at least partially positioned above the second mounting and the first mounting wherein the slot is arranged to receive an optical component.

20 Claims, 9 Drawing Sheets

(58) Field of Classification Search
CPC .......... G06F 2203/04103; G06F 3/042; G06F 3/0421

See application file for complete search history.

(56) References Cited

U.S. PATENT DOCUMENTS

| | | | |
|---|---|---|---|
| 3,478,220 A | 11/1969 | Milroy |
| 3,553,680 A | 1/1971 | Cooreman |
| 3,673,327 A | 6/1972 | Johnson et al. |
| 4,129,384 A | 12/1978 | Walker et al. |
| 4,180,702 A | 12/1979 | Hartmann et al. |
| 4,209,255 A | 6/1980 | Heynau et al. |
| 4,213,707 A | 7/1980 | Evans, Jr. |
| 4,254,333 A | 3/1981 | Arne |
| 4,254,407 A | 3/1981 | Tipon |
| 4,294,543 A | 10/1981 | Apple et al. |
| 4,346,376 A | 8/1982 | Mallos |
| 4,420,261 A | 12/1983 | Barlow et al. |
| 4,459,476 A | 7/1984 | Weissmueller et al. |
| 4,484,179 A | 11/1984 | Kasday |
| 4,507,557 A | 3/1985 | Tsikos |
| 4,521,112 A | 6/1985 | Kuwabara et al. |
| 4,542,375 A | 9/1985 | Alles et al. |
| 4,550,250 A | 10/1985 | Mueller et al. |
| 4,593,191 A | 6/1986 | Alles |
| 4,673,918 A | 6/1987 | Adler et al. |
| 4,688,933 A | 8/1987 | Lapeyre |
| 4,688,993 A | 8/1987 | Ferris et al. |
| 4,692,809 A | 9/1987 | Beining et al. |
| 4,710,760 A | 12/1987 | Kasday |
| 4,736,191 A | 4/1988 | Matzke et al. |
| 4,737,626 A | 4/1988 | Hasegawa |
| 4,746,770 A | 5/1988 | McAvinney |
| 4,751,379 A | 6/1988 | Sasaki et al. |
| 4,752,655 A | 6/1988 | Tajiri et al. |
| 4,766,424 A | 8/1988 | Adler et al. |
| 4,772,763 A | 9/1988 | Garwin et al. |
| 4,782,328 A | 11/1988 | Denlinger |
| 4,812,833 A | 3/1989 | Shimauchi |
| 4,820,050 A | 4/1989 | Griffin |
| 4,837,430 A | 6/1989 | Hasegawa |
| 4,868,550 A | 9/1989 | Sasaki et al. |
| 4,868,912 A | 9/1989 | Doering |
| 4,891,829 A | 1/1990 | Deckman et al. |
| 4,916,308 A | 4/1990 | Meadows |
| 4,916,712 A | 4/1990 | Bender |
| 4,933,544 A | 6/1990 | Tamaru |
| 4,949,079 A | 8/1990 | Loebner |
| 4,986,662 A | 1/1991 | Bures |
| 4,988,983 A | 1/1991 | Wehrer |
| 4,994,677 A | 2/1991 | Graindorge |
| 5,065,185 A | 11/1991 | Powers et al. |
| 5,073,770 A | 12/1991 | Lowbner |
| 5,105,186 A | 4/1992 | May |
| 5,115,677 A | 5/1992 | Martin et al. |
| 5,155,813 A | 10/1992 | Donoghue et al. |
| 5,159,322 A | 10/1992 | Loebner |
| 5,162,783 A | 11/1992 | Moreno |
| 5,166,668 A | 11/1992 | Aoyagi |
| 5,175,030 A | 12/1992 | Lu et al. |
| 5,227,622 A | 7/1993 | Suzuki |
| 5,248,856 A | 9/1993 | Mallicoat |
| 5,254,407 A | 10/1993 | Sergerie et al. |
| 5,345,490 A | 9/1994 | Finnigan et al. |
| 5,383,022 A | 1/1995 | Kaeser |
| 5,414,413 A | 5/1995 | Tamaru et al. |
| 5,434,373 A | 7/1995 | Komaki |
| 5,483,261 A | 1/1996 | Yasutake |
| 5,484,966 A | 1/1996 | Segen |
| 5,499,098 A | 3/1996 | Ogawa |
| 5,502,568 A | 3/1996 | Ogawa et al. |
| 5,515,083 A | 5/1996 | Casebolt et al. |
| 5,525,764 A | 6/1996 | Junkins et al. |
| 5,526,422 A | 6/1996 | Keen |
| 5,539,514 A | 7/1996 | Shishido et al. |
| 5,543,591 A | 8/1996 | Gillespie et al. |
| 5,570,181 A | 10/1996 | Yasuo et al. |
| 5,572,251 A | 11/1996 | Ogawa |
| 5,577,501 A | 11/1996 | Flohr et al. |
| 5,600,105 A | 2/1997 | Fukuzaki et al. |
| 5,605,406 A | 2/1997 | Bowen |
| 5,608,550 A | 3/1997 | Epstein et al. |
| 5,672,852 A | 9/1997 | Fukuzaki et al. |
| 5,677,082 A | 10/1997 | Greinke et al. |
| 5,679,930 A | 10/1997 | Katsurahira |
| 5,686,942 A | 11/1997 | Ball |
| 5,688,933 A | 11/1997 | Evans et al. |
| 5,729,249 A | 3/1998 | Yasutake |
| 5,729,250 A | 3/1998 | Bishop et al. |
| 5,736,686 A | 4/1998 | Perret et al. |
| 5,740,224 A | 4/1998 | Mueller et al. |
| 5,746,423 A | 5/1998 | Arov |
| 5,764,223 A | 6/1998 | Chang et al. |
| 5,767,517 A | 6/1998 | Hawkins |
| 5,775,792 A | 7/1998 | Wiese |
| 5,808,606 A | 9/1998 | Kodama et al. |
| 5,945,980 A | 8/1999 | Moissev et al. |
| 5,945,981 A | 8/1999 | Paull et al. |
| 5,959,617 A | 9/1999 | Bird et al. |
| 6,031,524 A | 2/2000 | Kunert |
| 6,061,177 A | 5/2000 | Fujimoto |
| 6,067,079 A | 5/2000 | Shieh |
| 6,072,450 A | 6/2000 | Yamada et al. |
| 6,100,538 A | 8/2000 | Ogawa |
| 6,122,394 A | 9/2000 | Neukermans et al. |
| 6,141,104 A | 10/2000 | Schulz et al. |
| 6,172,667 B1 | 1/2001 | Sayag |
| 6,175,999 B1 | 1/2001 | Sloan et al. |
| 6,227,667 B1 | 5/2001 | Halldorsson et al. |
| 6,229,529 B1 | 5/2001 | Yano et al. |
| 6,315,156 B1 | 11/2001 | Mahoney et al. |
| 6,333,735 B1 | 12/2001 | Anvekar |
| 6,340,967 B1 | 1/2002 | Maxted |
| 6,366,276 B1 | 4/2002 | Kunimatsu et al. |
| 6,380,732 B1 | 4/2002 | Gilboa |
| 6,380,740 B1 | 4/2002 | Laub |
| 6,390,370 B1 | 5/2002 | Plesko |
| 6,429,857 B1 | 8/2002 | Masters et al. |
| 6,452,996 B1 | 9/2002 | Hsieh |
| 6,476,797 B1 | 11/2002 | Kurihara et al. |
| 6,480,187 B1 | 11/2002 | Sano et al. |
| 6,492,633 B2 | 12/2002 | Nakazawa et al. |
| 6,495,832 B1 | 12/2002 | Kirby |
| 6,504,143 B2 | 1/2003 | Koops et al. |
| 6,504,530 B1 | 1/2003 | Wilson et al. |
| 6,524,749 B1 | 2/2003 | Kaneda et al. |
| 6,529,327 B1 | 3/2003 | Graindorge |
| 6,535,213 B1 | 3/2003 | Ogino et al. |
| 6,538,644 B1 | 3/2003 | Muraoka |
| 6,587,099 B2 | 7/2003 | Takekawa |
| 6,648,485 B1 | 11/2003 | Colgan et al. |
| 6,660,964 B1 | 12/2003 | Benderly |
| 6,664,498 B2 | 12/2003 | Forsman et al. |
| 6,664,952 B2 | 12/2003 | Iwamoto et al. |
| 6,677,934 B1 | 1/2004 | Blanchard |
| 6,690,363 B2 | 2/2004 | Newton |
| 6,692,807 B2 | 2/2004 | Bries et al. |
| 6,707,027 B2 | 3/2004 | Liess et al. |
| 6,710,767 B1 | 3/2004 | Hasegawa et al. |
| 6,738,051 B2 | 5/2004 | Boyd et al. |
| 6,748,098 B1 | 6/2004 | Rosenfeld |
| 6,784,948 B2 | 8/2004 | Kawashima et al. |
| 6,799,141 B1 | 9/2004 | Stoustrup et al. |
| 6,803,900 B1 | 10/2004 | Berkoff et al. |
| 6,806,871 B1 | 10/2004 | Yasue |
| 6,828,959 B2 | 12/2004 | Takekawa et al. |
| 6,911,646 B1 | 6/2005 | Weitekamp |
| 6,927,384 B2 | 8/2005 | Reime et al. |
| 6,940,286 B2 | 9/2005 | Wang et al. |
| 6,965,836 B2 | 11/2005 | Richardson |
| 6,972,401 B2 | 12/2005 | Akitt et al. |
| 6,972,753 B1 | 12/2005 | Kimura et al. |
| 6,985,137 B2 | 1/2006 | Kaikuranta |
| 7,042,444 B2 | 5/2006 | Cok |

(56) References Cited

U.S. PATENT DOCUMENTS

| | | |
|---|---|---|
| 7,084,859 B1 | 8/2006 | Pryor |
| 7,087,907 B1 | 8/2006 | Lalovic et al. |
| 7,117,157 B1 | 10/2006 | Taylor et al. |
| 7,133,031 B2 | 11/2006 | Wang et al. |
| 7,151,530 B2 | 12/2006 | Roeber et al. |
| 7,176,904 B2 | 2/2007 | Satoh |
| 7,199,932 B2 | 4/2007 | Sugiura |
| 7,359,041 B2 | 4/2008 | Xie et al. |
| 7,397,418 B1 | 7/2008 | Doerry et al. |
| 7,432,893 B2 | 10/2008 | Ma et al. |
| 7,435,940 B2 | 10/2008 | Eliasson et al. |
| 7,436,443 B2 | 10/2008 | Hirunuma et al. |
| 7,442,914 B2 | 10/2008 | Eliasson et al. |
| 7,465,914 B2 | 12/2008 | Eliasson et al. |
| 7,528,898 B2 | 5/2009 | Hashimoto |
| D602,498 S | 10/2009 | Arnell |
| 7,613,375 B2 | 11/2009 | Shimizu |
| 7,629,968 B2 | 12/2009 | Miller et al. |
| 7,646,833 B1 | 1/2010 | He et al. |
| 7,653,883 B2 | 1/2010 | Hotelling et al. |
| 7,655,901 B2 | 2/2010 | Idzik et al. |
| 7,705,835 B2 | 4/2010 | Eikman |
| 7,712,041 B2 | 5/2010 | Toyama et al. |
| 7,729,056 B2 | 6/2010 | Hwang et al. |
| 7,812,826 B2 | 10/2010 | Ording et al. |
| 7,847,789 B2 | 12/2010 | Kolmykov-Zotov et al. |
| 7,855,716 B2 | 12/2010 | McCreary et al. |
| 7,859,519 B2 | 12/2010 | Tulbert |
| 7,924,272 B2 | 4/2011 | Boer et al. |
| 7,932,899 B2 | 4/2011 | Newton et al. |
| 7,956,847 B2 | 6/2011 | Christie |
| 7,969,410 B2 | 6/2011 | Kakarala |
| 7,995,039 B2 | 8/2011 | Eliasson et al. |
| 8,013,845 B2 | 9/2011 | Ostergaard et al. |
| 8,031,186 B2 | 10/2011 | Ostergaard |
| 8,077,147 B2 | 12/2011 | Krah et al. |
| 8,093,545 B2 | 1/2012 | Leong et al. |
| 8,094,136 B2 | 1/2012 | Eliasson et al. |
| 8,094,910 B2 | 1/2012 | Xu et al. |
| 8,139,046 B2 | 3/2012 | Kweon et al. |
| 8,149,211 B2 | 4/2012 | Hayakawa et al. |
| 8,149,221 B2 | 4/2012 | Newton |
| 8,154,418 B2 | 4/2012 | Peterson et al. |
| 8,184,108 B2 | 5/2012 | Smits |
| 8,194,036 B1 | 6/2012 | Braun et al. |
| 8,217,854 B2 | 7/2012 | Bhogal et al. |
| 8,218,154 B2 | 7/2012 | Oestergaard et al. |
| 8,274,495 B2 | 9/2012 | Lee |
| D669,497 S | 10/2012 | Lee et al. |
| 8,314,773 B2 | 11/2012 | Low et al. |
| 8,319,729 B2 | 11/2012 | Choi et al. |
| 8,325,158 B2 | 12/2012 | Yatsuda et al. |
| 8,339,379 B2 | 12/2012 | Goertz et al. |
| 8,350,827 B2 | 1/2013 | Chung et al. |
| D675,644 S | 2/2013 | Frost et al. |
| 8,384,010 B2 | 2/2013 | Hong et al. |
| 8,384,693 B2 | 2/2013 | Newton |
| 8,407,606 B1 | 3/2013 | Davidson et al. |
| 8,436,833 B2 | 5/2013 | King et al. |
| 8,441,467 B2 | 5/2013 | Han |
| 8,445,834 B2 | 5/2013 | Hong et al. |
| 8,466,901 B2 | 6/2013 | Yen et al. |
| 8,482,547 B2 | 7/2013 | Christiansson et al. |
| 8,542,217 B2 | 9/2013 | Wassvik et al. |
| 8,553,014 B2 | 10/2013 | Holmgren et al. |
| 8,567,257 B2 | 10/2013 | Van et al. |
| 8,571,171 B2 | 10/2013 | Tischenko et al. |
| 8,581,884 B2 | 11/2013 | Fåhraeus et al. |
| 8,587,562 B2 | 11/2013 | Goertz et al. |
| 8,599,140 B2 | 12/2013 | Crockett et al. |
| 8,610,672 B2 | 12/2013 | Kun et al. |
| 8,624,858 B2 | 1/2014 | Fyke et al. |
| 8,674,963 B2 | 3/2014 | Cornish et al. |
| 8,676,007 B2 | 3/2014 | Holmgren et al. |
| 8,686,974 B2 | 4/2014 | Christiansson et al. |
| 8,692,807 B2 | 4/2014 | Foehraeus et al. |
| 8,716,614 B2 | 5/2014 | Wassvik |
| 8,727,581 B2 | 5/2014 | Saccomanno |
| 8,745,514 B1 | 6/2014 | Davidson |
| 8,749,527 B2 | 6/2014 | Douxchamps et al. |
| 8,780,066 B2 | 7/2014 | Christiansson et al. |
| 8,830,181 B1 | 9/2014 | Clark et al. |
| 8,837,882 B2 | 9/2014 | Holmgren et al. |
| 8,860,696 B2 | 10/2014 | Wassvik et al. |
| 8,866,870 B1 | 10/2014 | Smith |
| 8,872,098 B2 | 10/2014 | Bergstrm et al. |
| 8,872,801 B2 | 10/2014 | Bergstrm et al. |
| D716,820 S | 11/2014 | Wood |
| 8,884,900 B2 | 11/2014 | Wassvik |
| 8,890,843 B2 | 11/2014 | Wassvik et al. |
| 8,890,849 B2 | 11/2014 | Christiansson et al. |
| 8,896,575 B2 | 11/2014 | Goertz et al. |
| 8,902,196 B2 | 12/2014 | Goertz et al. |
| 8,913,035 B2 | 12/2014 | Lai et al. |
| 8,928,590 B1 | 1/2015 | El Dokor |
| 8,928,609 B2 | 1/2015 | Italia et al. |
| 8,963,886 B2 | 2/2015 | Wassvik |
| 8,982,084 B2 | 3/2015 | Christiansson et al. |
| 9,001,086 B1 | 4/2015 | Saini |
| 9,024,896 B2 | 5/2015 | Chen |
| 9,024,916 B2 | 5/2015 | Christiansson |
| 9,025,855 B1 | 5/2015 | Christoph et al. |
| 9,035,909 B2 | 5/2015 | Christiansson |
| 9,052,771 B2 | 6/2015 | Goertz et al. |
| 9,063,614 B2 | 6/2015 | Pettersson et al. |
| 9,063,617 B2 | 6/2015 | Eliasson et al. |
| 9,086,763 B2 | 7/2015 | Johansson et al. |
| 9,092,091 B2 | 7/2015 | Piot et al. |
| 9,128,250 B2 | 9/2015 | Charters et al. |
| 9,134,854 B2 | 9/2015 | Wassvik et al. |
| 9,137,891 B2 | 9/2015 | Gibbs et al. |
| 9,158,401 B2 | 10/2015 | Christiansson et al. |
| 9,158,415 B2 | 10/2015 | Song et al. |
| 9,158,416 B2 | 10/2015 | Eriksson et al. |
| 9,164,625 B2 | 10/2015 | Holmgren et al. |
| 9,195,344 B2 | 11/2015 | Goertz et al. |
| 9,201,520 B2 | 12/2015 | Benko et al. |
| 9,207,800 B1 | 12/2015 | Eriksson et al. |
| 9,213,443 B2 | 12/2015 | Goertz et al. |
| 9,213,445 B2 | 12/2015 | King et al. |
| 9,223,441 B1 | 12/2015 | Bohn |
| 9,274,645 B2 | 3/2016 | Christiansson et al. |
| 9,280,237 B2 | 3/2016 | Kukulj |
| 9,291,845 B2 | 3/2016 | Shin et al. |
| 9,292,132 B2 | 3/2016 | An et al. |
| 9,317,146 B1 | 4/2016 | Hufnagel |
| 9,317,168 B2 | 4/2016 | Christiansson et al. |
| 9,318,156 B2 | 4/2016 | Kanapathippillai et al. |
| 9,323,396 B2 | 4/2016 | Han et al. |
| 9,335,867 B2 | 5/2016 | Holmgren et al. |
| 9,366,565 B2 | 6/2016 | Uvns |
| 9,366,802 B2 | 6/2016 | Lee et al. |
| 9,377,884 B2 | 6/2016 | Christiansson et al. |
| 9,389,730 B2 | 7/2016 | Goertz et al. |
| 9,389,732 B2 | 7/2016 | Craven-Bartle |
| 9,411,430 B2 | 8/2016 | Holmgren et al. |
| 9,411,444 B2 | 8/2016 | Christiansson et al. |
| 9,411,464 B2 | 8/2016 | Wallander et al. |
| 9,430,079 B2 | 8/2016 | Christiansson et al. |
| 9,442,574 B2 | 9/2016 | Fåhraeus et al. |
| D768,674 S | 10/2016 | Hanover |
| 9,471,170 B2 | 10/2016 | Goertz et al. |
| 9,547,393 B2 | 1/2017 | Christiansson et al. |
| 9,552,103 B2 | 1/2017 | Craven-Bartle et al. |
| 9,557,846 B2 | 1/2017 | Baharav et al. |
| 9,563,298 B2 | 2/2017 | Sakashita et al. |
| D782,516 S | 3/2017 | Hhne et al. |
| 9,588,619 B2 | 3/2017 | Christiansson et al. |
| 9,594,467 B2 | 3/2017 | Christiansson et al. |
| D783,042 S | 4/2017 | Kim et al. |
| 9,618,682 B2 | 4/2017 | Yoon et al. |
| 9,626,018 B2 | 4/2017 | Christiansson et al. |
| 9,626,040 B2 | 4/2017 | Wallander et al. |
| 9,639,210 B2 | 5/2017 | Wallander et al. |

(56) References Cited

U.S. PATENT DOCUMENTS

| | | |
|---|---|---|
| 9,645,679 B2 | 5/2017 | Eriksson et al. |
| 9,652,082 B1 | 5/2017 | Lin et al. |
| 9,671,900 B2 | 6/2017 | Piot et al. |
| 9,678,601 B2 | 6/2017 | Pettersson et al. |
| 9,678,602 B2 | 6/2017 | Wallander |
| 9,684,414 B2 | 6/2017 | Christiansson et al. |
| 9,710,101 B2 | 7/2017 | Christiansson et al. |
| 9,720,499 B2 | 8/2017 | Han et al. |
| 9,741,184 B2 | 8/2017 | Iyer et al. |
| D798,893 S | 10/2017 | Anzures et al. |
| 9,785,287 B2 | 10/2017 | Bergstrom et al. |
| 9,811,163 B2 | 11/2017 | Eriksson et al. |
| 9,811,209 B2 | 11/2017 | Christiansson et al. |
| D807,388 S | 1/2018 | Butcher et al. |
| D808,416 S | 1/2018 | Anzures et al. |
| 9,857,916 B2 | 1/2018 | Bergstrm et al. |
| 9,857,917 B2 | 1/2018 | Wassvik et al. |
| 9,864,470 B2 | 1/2018 | Christiansson |
| 9,874,978 B2 | 1/2018 | Wall |
| 9,921,661 B2 | 3/2018 | Eriksson et al. |
| 9,927,921 B2 | 3/2018 | Lee |
| 9,983,626 B2 | 5/2018 | Cao et al. |
| 9,983,717 B2 | 5/2018 | Pacheco et al. |
| 9,996,196 B2 | 6/2018 | Christiansson et al. |
| 10,001,881 B2 | 6/2018 | Wallander et al. |
| 10,004,985 B2 | 6/2018 | Holmgren et al. |
| D824,412 S | 7/2018 | Anzures et al. |
| 10,013,107 B2 | 7/2018 | Christiansson et al. |
| 10,019,113 B2 | 7/2018 | Christiansson et al. |
| 10,024,741 B2 | 7/2018 | Povazay et al. |
| 10,031,623 B2 | 7/2018 | Christiansson et al. |
| 10,048,773 B2 | 8/2018 | Fahraeus et al. |
| 10,088,919 B2 | 10/2018 | Tamura |
| 10,088,957 B2 | 10/2018 | Johansson et al. |
| 10,126,882 B2 | 11/2018 | Wassvik |
| 10,126,897 B2 | 11/2018 | Kwon et al. |
| 10,139,854 B2 | 11/2018 | Krishnakumar et al. |
| 10,146,376 B2 | 12/2018 | Wassvik et al. |
| 10,151,866 B2 | 12/2018 | Craven-Bartle et al. |
| 10,152,176 B2 | 12/2018 | Wallander |
| 10,161,886 B2 | 12/2018 | Ohlsson et al. |
| D837,829 S | 1/2019 | Balles et al. |
| D838,280 S | 1/2019 | Coburn et al. |
| 10,168,835 B2 | 1/2019 | Wallander et al. |
| D842,312 S | 3/2019 | Na et al. |
| 10,261,639 B2 | 4/2019 | Lee et al. |
| 10,268,288 B1 | 4/2019 | Wang et al. |
| 10,268,319 B2 | 4/2019 | Wassvik et al. |
| 10,282,035 B2 | 5/2019 | Kocovski et al. |
| 10,317,200 B1 | 6/2019 | Han et al. |
| 10,318,041 B2 | 6/2019 | Björklund et al. |
| 10,318,074 B2 | 6/2019 | Klinghult et al. |
| 10,324,565 B2 | 6/2019 | Rosengren et al. |
| 10,324,566 B2 | 6/2019 | Christiansson |
| D852,842 S | 7/2019 | Hung et al. |
| 10,365,768 B2 | 7/2019 | Craven-Bartle et al. |
| 10,372,265 B2 | 8/2019 | Christiansson et al. |
| 10,397,638 B2 | 8/2019 | Kanematsu et al. |
| 10,401,546 B2 | 9/2019 | Craven-Bartle et al. |
| 10,417,219 B1 | 9/2019 | Yang et al. |
| 10,437,358 B2 | 10/2019 | Geaghan et al. |
| 10,437,389 B2 | 10/2019 | Skagmo et al. |
| 10,459,589 B2 | 10/2019 | Xu et al. |
| 10,459,590 B2 | 10/2019 | Lin et al. |
| 10,474,249 B2 | 11/2019 | Fahraeus et al. |
| 10,481,737 B2 | 11/2019 | Christiansson et al. |
| 10,496,227 B2 | 12/2019 | Wassvik et al. |
| 10,579,227 B1 | 3/2020 | Bura et al. |
| 10,606,414 B2 | 3/2020 | Christiansson et al. |
| 10,606,416 B2 | 3/2020 | Skagmo et al. |
| 10,642,386 B2 | 5/2020 | Makelainen et al. |
| 10,649,585 B1 | 5/2020 | Van et al. |
| 10,691,638 B1 | 6/2020 | Lyadvinsky et al. |
| D892,855 S | 8/2020 | Liu |
| 10,739,916 B2 | 8/2020 | Skagmo et al. |
| 10,761,657 B2 | 9/2020 | Christiansson et al. |
| 10,775,935 B2 | 9/2020 | Kocovski et al. |
| 10,775,937 B2 | 9/2020 | Christiansson et al. |
| 10,845,923 B2 | 11/2020 | Skagmo et al. |
| 10,853,315 B1 | 12/2020 | Faibish et al. |
| 10,860,142 B1 | 12/2020 | Northcott et al. |
| 10,884,275 B2 | 1/2021 | Yang et al. |
| 10,884,553 B2 | 1/2021 | Weilbacher et al. |
| 10,892,303 B2 | 1/2021 | Li |
| 10,963,104 B2 | 3/2021 | Bergström et al. |
| 11,016,605 B2 | 5/2021 | Christiansson et al. |
| 11,029,783 B2 | 6/2021 | Wassvik et al. |
| 11,099,688 B2 | 8/2021 | Christiansson et al. |
| 11,106,312 B2 | 8/2021 | Christiansson et al. |
| 11,106,314 B2 | 8/2021 | Krishnakumar et al. |
| 11,119,565 B2 | 9/2021 | Avila et al. |
| 11,175,756 B2 | 11/2021 | Andersson et al. |
| 11,182,023 B2 | 11/2021 | Ohlsson et al. |
| 11,243,640 B2 | 2/2022 | Ancona et al. |
| 11,256,371 B2 | 2/2022 | Craven-Bartle et al. |
| 11,263,028 B2 | 3/2022 | Momchilov |
| 11,269,460 B2 | 3/2022 | Skagmo et al. |
| 11,281,335 B2 | 3/2022 | Kocovski et al. |
| 11,281,338 B2 | 3/2022 | Skagmo et al. |
| 11,301,089 B2 | 4/2022 | Christiansson et al. |
| 11,474,644 B2 | 10/2022 | Kocovski et al. |
| 11,567,610 B2 | 1/2023 | Bergström et al. |
| 11,579,731 B2 | 2/2023 | Kocovski et al. |
| 11,579,732 B2 | 2/2023 | Skagmo et al. |
| 11,650,699 B2 * | 5/2023 | Bergström ............ G06F 3/0421 345/176 |
| 11,740,741 B2 | 8/2023 | Bergström et al. |
| 11,868,568 B2 | 1/2024 | Kocovski et al. |
| 11,893,189 B2 | 2/2024 | Bergström |
| 11,909,033 B2 | 2/2024 | Tsuzuki et al. |
| 11,914,819 B2 | 2/2024 | Kocovski et al. |
| 2001/0005004 A1 | 6/2001 | Shiratsuki et al. |
| 2001/0005308 A1 | 6/2001 | Oishi et al. |
| 2001/0030642 A1 | 10/2001 | Sullivan et al. |
| 2001/0055411 A1 | 12/2001 | Black |
| 2002/0085003 A1 | 7/2002 | Nagashima |
| 2002/0118177 A1 | 8/2002 | Newton |
| 2002/0130883 A1 | 9/2002 | Huang et al. |
| 2002/0158823 A1 | 10/2002 | Zavracky et al. |
| 2002/0158853 A1 | 10/2002 | Sugawara et al. |
| 2002/0175901 A1 | 11/2002 | Gettemy |
| 2003/0016450 A1 | 1/2003 | Bluemel et al. |
| 2003/0034935 A1 | 2/2003 | Amanai et al. |
| 2003/0048257 A1 | 3/2003 | Mattila |
| 2003/0052257 A1 | 3/2003 | Sumriddetchkajorn |
| 2003/0085882 A1 | 5/2003 | Lu |
| 2003/0095399 A1 | 5/2003 | Grenda et al. |
| 2003/0107748 A1 | 6/2003 | Lee |
| 2003/0156100 A1 | 8/2003 | Gettemy |
| 2003/0160155 A1 | 8/2003 | Liess |
| 2003/0210537 A1 | 11/2003 | Engelmann |
| 2003/0214486 A1 | 11/2003 | Roberts |
| 2004/0027339 A1 | 2/2004 | Schulz |
| 2004/0032401 A1 | 2/2004 | Nakazawa et al. |
| 2004/0090432 A1 | 5/2004 | Takahashi et al. |
| 2004/0109664 A1 | 6/2004 | Ohtsuki et al. |
| 2004/0134772 A1 | 7/2004 | Cohen et al. |
| 2004/0174541 A1 | 9/2004 | Freifeld |
| 2004/0179001 A1 | 9/2004 | Morrison et al. |
| 2004/0201579 A1 | 10/2004 | Graham |
| 2004/0212603 A1 | 10/2004 | Cok |
| 2004/0238627 A1 | 12/2004 | Silverbrook et al. |
| 2004/0239702 A1 | 12/2004 | Kang et al. |
| 2004/0245438 A1 | 12/2004 | Payne et al. |
| 2004/0252867 A1 | 12/2004 | Lan et al. |
| 2005/0005319 A1 | 1/2005 | Della-Cioppa et al. |
| 2005/0012714 A1 | 1/2005 | Russo et al. |
| 2005/0022130 A1 | 1/2005 | Fabritius |
| 2005/0024624 A1 | 2/2005 | Gruhlke et al. |
| 2005/0041013 A1 | 2/2005 | Tanaka |
| 2005/0053191 A1 | 3/2005 | Gohno et al. |
| 2005/0057522 A1 | 3/2005 | Godler |
| 2005/0057903 A1 | 3/2005 | Choi |
| 2005/0073508 A1 | 4/2005 | Pittel et al. |

(56) References Cited

U.S. PATENT DOCUMENTS

| | | |
|---|---|---|
| 2005/0083293 A1 | 4/2005 | Dixon |
| 2005/0092900 A1 | 5/2005 | Reime et al. |
| 2005/0128190 A1 | 6/2005 | Ryynanen |
| 2005/0143923 A1 | 6/2005 | Keers et al. |
| 2005/0156914 A1 | 7/2005 | Lipman et al. |
| 2005/0162398 A1 | 7/2005 | Eliasson et al. |
| 2005/0168134 A1 | 8/2005 | Nishikawa |
| 2005/0179977 A1 | 8/2005 | Chui et al. |
| 2005/0200613 A1 | 9/2005 | Kobayashi et al. |
| 2005/0212774 A1 | 9/2005 | Ho et al. |
| 2005/0248540 A1 | 11/2005 | Newton |
| 2005/0248848 A1 | 11/2005 | Whitehead et al. |
| 2005/0253834 A1 | 11/2005 | Sakamaki et al. |
| 2005/0276053 A1 | 12/2005 | Nortrup et al. |
| 2006/0001650 A1 | 1/2006 | Robbins et al. |
| 2006/0007185 A1 | 1/2006 | Kobayashi |
| 2006/0008164 A1 | 1/2006 | Wu et al. |
| 2006/0013353 A1 | 1/2006 | Hein |
| 2006/0017706 A1 | 1/2006 | Cutherell et al. |
| 2006/0017709 A1 | 1/2006 | Okano |
| 2006/0033725 A1 | 2/2006 | Marggraff et al. |
| 2006/0038698 A1 | 2/2006 | Chen |
| 2006/0061861 A1 | 3/2006 | Munro et al. |
| 2006/0066586 A1 | 3/2006 | Gally et al. |
| 2006/0098004 A1 | 5/2006 | Cok |
| 2006/0132454 A1 | 6/2006 | Chen et al. |
| 2006/0139340 A1 | 6/2006 | Geaghan |
| 2006/0144237 A1 | 7/2006 | Liang et al. |
| 2006/0158437 A1 | 7/2006 | Blythe et al. |
| 2006/0164443 A1 | 7/2006 | Kettle et al. |
| 2006/0170658 A1 | 8/2006 | Nakamura et al. |
| 2006/0182345 A1 | 8/2006 | Geidl et al. |
| 2006/0202974 A1 | 9/2006 | Thielman |
| 2006/0256092 A1 | 11/2006 | Lee |
| 2006/0279558 A1 | 12/2006 | Van et al. |
| 2006/0281543 A1 | 12/2006 | Sutton et al. |
| 2006/0290684 A1 | 12/2006 | Giraldo et al. |
| 2007/0014486 A1 | 1/2007 | Schiwietz et al. |
| 2007/0034783 A1 | 2/2007 | Eliasson et al. |
| 2007/0038691 A1 | 2/2007 | Candes et al. |
| 2007/0052684 A1 | 3/2007 | Gruhlke et al. |
| 2007/0070056 A1 | 3/2007 | Sato et al. |
| 2007/0075648 A1 | 4/2007 | Blythe et al. |
| 2007/0083575 A1 | 4/2007 | Leung et al. |
| 2007/0120833 A1 | 5/2007 | Yamaguchi et al. |
| 2007/0132710 A1 | 6/2007 | Tateuchi et al. |
| 2007/0146337 A1 | 6/2007 | Ording et al. |
| 2007/0165008 A1 | 7/2007 | Crockett |
| 2007/0176162 A1 | 8/2007 | Kang |
| 2007/0195404 A1 | 8/2007 | Iijima |
| 2007/0285406 A1 | 12/2007 | Kukulj et al. |
| 2007/0296688 A1 | 12/2007 | Nakamura et al. |
| 2008/0006766 A1 | 1/2008 | Oon et al. |
| 2008/0007541 A1 | 1/2008 | Eliasson et al. |
| 2008/0011944 A1 | 1/2008 | Chua et al. |
| 2008/0012835 A1 | 1/2008 | Rimon et al. |
| 2008/0036743 A1 | 2/2008 | Westerman et al. |
| 2008/0062150 A1 | 3/2008 | Lee |
| 2008/0068691 A1 | 3/2008 | Miyatake |
| 2008/0080811 A1 | 4/2008 | Deane |
| 2008/0115081 A1 | 5/2008 | Sankaravadivelu et al. |
| 2008/0122792 A1 | 5/2008 | Izadi et al. |
| 2008/0122803 A1 | 5/2008 | Izadi et al. |
| 2008/0130979 A1 | 6/2008 | Ren et al. |
| 2008/0133265 A1 | 6/2008 | Silkaitis et al. |
| 2008/0150846 A1 | 6/2008 | Chung |
| 2008/0150848 A1 | 6/2008 | Chung et al. |
| 2008/0150915 A1 | 6/2008 | Shibue et al. |
| 2008/0151126 A1 | 6/2008 | Yu |
| 2008/0158176 A1 | 7/2008 | Land et al. |
| 2008/0180404 A1 | 7/2008 | Han et al. |
| 2008/0189046 A1 | 8/2008 | Eliasson et al. |
| 2008/0192025 A1 | 8/2008 | Jaeger et al. |
| 2008/0238433 A1 | 10/2008 | Joutsenoja et al. |
| 2008/0246388 A1 | 10/2008 | Cheon et al. |
| 2008/0252619 A1 | 10/2008 | Crockett et al. |
| 2008/0266266 A1 | 10/2008 | Kent et al. |
| 2008/0278460 A1 | 11/2008 | Arnett et al. |
| 2008/0280952 A1 | 11/2008 | Giblin et al. |
| 2008/0284925 A1 | 11/2008 | Han |
| 2008/0285406 A1 | 11/2008 | Moro et al. |
| 2008/0291668 A1 | 11/2008 | Aylward et al. |
| 2008/0297482 A1 | 12/2008 | Weiss |
| 2008/0309626 A1 | 12/2008 | Westerman et al. |
| 2009/0000831 A1 | 1/2009 | Miller et al. |
| 2009/0002340 A1 | 1/2009 | Van Genechten |
| 2009/0006292 A1 | 1/2009 | Block |
| 2009/0013562 A1 | 1/2009 | Pelletier |
| 2009/0040786 A1 | 2/2009 | Mori |
| 2009/0058833 A1 | 3/2009 | Newton |
| 2009/0066647 A1 | 3/2009 | Kerr et al. |
| 2009/0067178 A1 | 3/2009 | Huang et al. |
| 2009/0073142 A1 | 3/2009 | Yamashita et al. |
| 2009/0077501 A1 | 3/2009 | Partridge et al. |
| 2009/0085894 A1 | 4/2009 | Gandhi et al. |
| 2009/0091554 A1 | 4/2009 | Keam |
| 2009/0100383 A1 | 4/2009 | Sunday et al. |
| 2009/0115919 A1 | 5/2009 | Tanaka et al. |
| 2009/0127005 A1 | 5/2009 | Zachut et al. |
| 2009/0128499 A1 | 5/2009 | Izadi et al. |
| 2009/0128508 A1 | 5/2009 | Sohn et al. |
| 2009/0135162 A1 | 5/2009 | Van et al. |
| 2009/0143141 A1 | 6/2009 | Wells et al. |
| 2009/0153519 A1 | 6/2009 | Suarez Rovere |
| 2009/0161026 A1 | 6/2009 | Wu et al. |
| 2009/0168459 A1 | 7/2009 | Holman et al. |
| 2009/0174679 A1 | 7/2009 | Westerman |
| 2009/0187842 A1 | 7/2009 | Collins et al. |
| 2009/0189857 A1 | 7/2009 | Benko et al. |
| 2009/0189874 A1 | 7/2009 | Chene et al. |
| 2009/0209420 A1 | 8/2009 | Kalgutkar et al. |
| 2009/0219256 A1 | 9/2009 | Newton |
| 2009/0229892 A1 | 9/2009 | Fisher et al. |
| 2009/0251439 A1 | 10/2009 | Westerman et al. |
| 2009/0254869 A1 | 10/2009 | Ludwig et al. |
| 2009/0256817 A1 | 10/2009 | Perlin et al. |
| 2009/0259967 A1 | 10/2009 | Davidson et al. |
| 2009/0267919 A1 | 10/2009 | Chao et al. |
| 2009/0273795 A1 | 11/2009 | Bacher et al. |
| 2009/0278795 A1 | 11/2009 | Hansen et al. |
| 2009/0278816 A1 | 11/2009 | Colson |
| 2009/0278913 A1 | 11/2009 | Rosenfeld et al. |
| 2009/0295752 A1 | 12/2009 | Liu et al. |
| 2010/0007331 A1 | 1/2010 | Hawkins et al. |
| 2010/0014024 A1 | 1/2010 | Tatsumi et al. |
| 2010/0026667 A1 | 2/2010 | Bernstein |
| 2010/0033444 A1 | 2/2010 | Kobayashi |
| 2010/0045629 A1 | 2/2010 | Newton |
| 2010/0045634 A1 | 2/2010 | Su et al. |
| 2010/0059295 A1 | 3/2010 | Hotelling et al. |
| 2010/0060896 A1 | 3/2010 | Van et al. |
| 2010/0066016 A1 | 3/2010 | Van et al. |
| 2010/0066704 A1 | 3/2010 | Kasai |
| 2010/0073318 A1 | 3/2010 | Hu et al. |
| 2010/0073327 A1 | 3/2010 | Mau et al. |
| 2010/0079407 A1 | 4/2010 | Suggs |
| 2010/0079408 A1 | 4/2010 | Leong et al. |
| 2010/0097345 A1 | 4/2010 | Jang et al. |
| 2010/0097348 A1 | 4/2010 | Park et al. |
| 2010/0097353 A1 | 4/2010 | Newton |
| 2010/0103133 A1 | 4/2010 | Park et al. |
| 2010/0125438 A1 | 5/2010 | Audet |
| 2010/0127975 A1 | 5/2010 | Jensen |
| 2010/0128985 A1 | 5/2010 | El-Sana et al. |
| 2010/0130257 A1 | 5/2010 | Jang |
| 2010/0130280 A1 | 5/2010 | Arezina et al. |
| 2010/0134435 A1 | 6/2010 | Kimura et al. |
| 2010/0141604 A1 | 6/2010 | Cai et al. |
| 2010/0142823 A1 | 6/2010 | Wang et al. |
| 2010/0166276 A1 | 7/2010 | Dube et al. |
| 2010/0176732 A1 | 7/2010 | Schenk et al. |
| 2010/0187422 A1 | 7/2010 | Kothari et al. |
| 2010/0189376 A1 | 7/2010 | Bertram et al. |
| 2010/0195804 A1 | 8/2010 | Dafni et al. |

(56) References Cited

U.S. PATENT DOCUMENTS

| | | |
|---|---|---|
| 2010/0207874 A1 | 8/2010 | Yuxin et al. |
| 2010/0229091 A1 | 9/2010 | Homma et al. |
| 2010/0238139 A1 | 9/2010 | Goertz et al. |
| 2010/0238686 A1 | 9/2010 | Weber et al. |
| 2010/0245292 A1 | 9/2010 | Wu |
| 2010/0253645 A1 | 10/2010 | Bolender |
| 2010/0259939 A1 | 10/2010 | Chen et al. |
| 2010/0265170 A1 | 10/2010 | Norieda |
| 2010/0277431 A1 | 11/2010 | Klinghult |
| 2010/0277436 A1 | 11/2010 | Feng et al. |
| 2010/0277728 A1 | 11/2010 | Imura |
| 2010/0283785 A1 | 11/2010 | Satulovsky |
| 2010/0284596 A1 | 11/2010 | Miao et al. |
| 2010/0289754 A1 | 11/2010 | Sleeman et al. |
| 2010/0295821 A1 | 11/2010 | Chang et al. |
| 2010/0302209 A1 | 12/2010 | Large |
| 2010/0302210 A1 | 12/2010 | Han et al. |
| 2010/0302240 A1 | 12/2010 | Lettvin |
| 2010/0309139 A1 | 12/2010 | Ng |
| 2010/0315379 A1* | 12/2010 | Allard ..................... G06F 3/042 445/24 |
| 2010/0321328 A1 | 12/2010 | Chang et al. |
| 2010/0322550 A1 | 12/2010 | Trott |
| 2010/0325547 A1 | 12/2010 | Keng et al. |
| 2010/0328265 A1 | 12/2010 | Hotelling et al. |
| 2011/0007021 A1 | 1/2011 | Bernstein et al. |
| 2011/0037735 A1 | 2/2011 | Land et al. |
| 2011/0043490 A1* | 2/2011 | Powell ................. G06F 3/0421 345/176 |
| 2011/0049388 A1 | 3/2011 | Delaney et al. |
| 2011/0050576 A1 | 3/2011 | Forutanpour et al. |
| 2011/0051394 A1 | 3/2011 | Bailey |
| 2011/0057102 A1 | 3/2011 | Yao |
| 2011/0065424 A1 | 3/2011 | Estevez et al. |
| 2011/0069039 A1 | 3/2011 | Lee et al. |
| 2011/0069807 A1 | 3/2011 | Dennerlein et al. |
| 2011/0074725 A1 | 3/2011 | Westerman et al. |
| 2011/0080361 A1 | 4/2011 | Miller et al. |
| 2011/0084939 A1 | 4/2011 | Gepner et al. |
| 2011/0096293 A1 | 4/2011 | Hirose et al. |
| 2011/0102320 A1 | 5/2011 | Hauke et al. |
| 2011/0102538 A1 | 5/2011 | Tan |
| 2011/0115748 A1 | 5/2011 | Xu |
| 2011/0121323 A1 | 5/2011 | Wu et al. |
| 2011/0122075 A1 | 5/2011 | Seo et al. |
| 2011/0122094 A1 | 5/2011 | Tsang et al. |
| 2011/0134079 A1* | 6/2011 | Stark ..................... G06F 3/0488 250/221 |
| 2011/0140106 A1 | 6/2011 | Forbes |
| 2011/0141062 A1* | 6/2011 | Yu ........................ G06F 3/0428 345/175 |
| 2011/0147569 A1 | 6/2011 | Drumm |
| 2011/0157095 A1 | 6/2011 | Drumm |
| 2011/0157096 A1 | 6/2011 | Drumm |
| 2011/0163996 A1 | 7/2011 | Wassvik et al. |
| 2011/0163997 A1 | 7/2011 | Kim |
| 2011/0169756 A1 | 7/2011 | Ogawa et al. |
| 2011/0199297 A1 | 8/2011 | Antonyuk et al. |
| 2011/0205186 A1 | 8/2011 | Newton et al. |
| 2011/0205189 A1 | 8/2011 | Newton |
| 2011/0205750 A1 | 8/2011 | Krijn et al. |
| 2011/0210946 A1 | 9/2011 | Goertz et al. |
| 2011/0220794 A1 | 9/2011 | Censor et al. |
| 2011/0221705 A1 | 9/2011 | Yi et al. |
| 2011/0221997 A1 | 9/2011 | Kim et al. |
| 2011/0227036 A1 | 9/2011 | Vaufrey |
| 2011/0234537 A1 | 9/2011 | Kim et al. |
| 2011/0254864 A1 | 10/2011 | Tsuchikawa et al. |
| 2011/0255305 A1 | 10/2011 | Chen et al. |
| 2011/0260829 A1 | 10/2011 | Lee |
| 2011/0266423 A1 | 11/2011 | Koeppe et al. |
| 2011/0267296 A1 | 11/2011 | Noguchi et al. |
| 2011/0287317 A1 | 11/2011 | Nakanishi |
| 2011/0291944 A1 | 12/2011 | Simmons et al. |
| 2011/0291988 A1 | 12/2011 | Bamji et al. |
| 2011/0298743 A1 | 12/2011 | Machida et al. |
| 2011/0304577 A1 | 12/2011 | Brown et al. |
| 2011/0309325 A1 | 12/2011 | Park et al. |
| 2011/0310045 A1 | 12/2011 | Toda et al. |
| 2011/0316005 A1 | 12/2011 | Murao et al. |
| 2012/0007835 A1 | 1/2012 | Chang et al. |
| 2012/0017182 A1 | 1/2012 | Bau |
| 2012/0019448 A1 | 1/2012 | Pitkanen et al. |
| 2012/0026408 A1 | 2/2012 | Lee et al. |
| 2012/0038593 A1 | 2/2012 | Roenkae et al. |
| 2012/0044572 A1 | 2/2012 | Simmonds et al. |
| 2012/0045170 A1 | 2/2012 | Shibata et al. |
| 2012/0050336 A1 | 3/2012 | Nave et al. |
| 2012/0056081 A1 | 3/2012 | Kozodoy |
| 2012/0056807 A1 | 3/2012 | Chapman et al. |
| 2012/0056814 A1 | 3/2012 | Sudo |
| 2012/0062474 A1 | 3/2012 | Weishaupt et al. |
| 2012/0062489 A1 | 3/2012 | Andersson et al. |
| 2012/0062492 A1 | 3/2012 | Katoh |
| 2012/0068973 A1 | 3/2012 | Christiansson et al. |
| 2012/0086673 A1 | 4/2012 | Chien et al. |
| 2012/0089348 A1 | 4/2012 | Perlin et al. |
| 2012/0091912 A1 | 4/2012 | Brown Elliott |
| 2012/0096383 A1 | 4/2012 | Sakamoto et al. |
| 2012/0098733 A1 | 4/2012 | Masuda et al. |
| 2012/0110447 A1 | 5/2012 | Chen |
| 2012/0131490 A1 | 5/2012 | Lin et al. |
| 2012/0141001 A1 | 6/2012 | Zhang et al. |
| 2012/0146930 A1 | 6/2012 | Lee |
| 2012/0146950 A1 | 6/2012 | Park et al. |
| 2012/0146957 A1 | 6/2012 | Dunagan |
| 2012/0154339 A1 | 6/2012 | Land et al. |
| 2012/0170056 A1 | 7/2012 | Jakobsen et al. |
| 2012/0173343 A1 | 7/2012 | Koning |
| 2012/0176343 A1 | 7/2012 | Holmgren et al. |
| 2012/0181419 A1 | 7/2012 | Momtahan |
| 2012/0182266 A1 | 7/2012 | Han |
| 2012/0188205 A1 | 7/2012 | Jansson et al. |
| 2012/0188206 A1 | 7/2012 | Sparf et al. |
| 2012/0191993 A1 | 7/2012 | Drader et al. |
| 2012/0200532 A1 | 8/2012 | Powell et al. |
| 2012/0200538 A1 | 8/2012 | Christiansson et al. |
| 2012/0212457 A1 | 8/2012 | Drumm |
| 2012/0217882 A1 | 8/2012 | Wong et al. |
| 2012/0218200 A1 | 8/2012 | Glazer et al. |
| 2012/0218229 A1 | 8/2012 | Drumm |
| 2012/0221715 A1 | 8/2012 | Hamada |
| 2012/0235892 A1 | 9/2012 | Narendra et al. |
| 2012/0242622 A1 | 9/2012 | Tseng et al. |
| 2012/0249477 A1* | 10/2012 | Popovich ................. G06F 3/042 345/175 |
| 2012/0249478 A1 | 10/2012 | Chang et al. |
| 2012/0249478 A1 | 10/2012 | Ye et al. |
| 2012/0256882 A1 | 10/2012 | Christiansson et al. |
| 2012/0257004 A1 | 10/2012 | Smith et al. |
| 2012/0262407 A1 | 10/2012 | Hinckley et al. |
| 2012/0268427 A1 | 10/2012 | Slobodin |
| 2012/0274559 A1 | 11/2012 | Mathai et al. |
| 2012/0274583 A1 | 11/2012 | Haggerty |
| 2012/0299852 A1 | 11/2012 | Hsu et al. |
| 2012/0313865 A1 | 12/2012 | Pearce |
| 2013/0002536 A1 | 1/2013 | Yoshida et al. |
| 2013/0007579 A1 | 1/2013 | Dancy et al. |
| 2013/0021302 A1 | 1/2013 | Drumm |
| 2013/0027404 A1 | 1/2013 | Sarnoff |
| 2013/0050141 A1 | 2/2013 | Park et al. |
| 2013/0055080 A1 | 2/2013 | Komer et al. |
| 2013/0055143 A1 | 2/2013 | Martin et al. |
| 2013/0076697 A1 | 3/2013 | Goertz et al. |
| 2013/0082980 A1 | 4/2013 | Gruhlke et al. |
| 2013/0093838 A1 | 4/2013 | Tan et al. |
| 2013/0106709 A1 | 5/2013 | Simmons |
| 2013/0107569 A1 | 5/2013 | Suganuma |
| 2013/0113715 A1 | 5/2013 | Grant et al. |
| 2013/0120274 A1 | 5/2013 | Ha et al. |
| 2013/0120320 A1 | 5/2013 | Liu et al. |
| 2013/0120324 A1 | 5/2013 | Diverdi et al. |
| 2013/0125016 A1 | 5/2013 | Pallakoff et al. |
| 2013/0135259 A1 | 5/2013 | King et al. |

(56) References Cited

U.S. PATENT DOCUMENTS

| | | |
|---|---|---|
| 2013/0136304 A1 | 5/2013 | Anabuki et al. |
| 2013/0141388 A1 | 6/2013 | Ludwig et al. |
| 2013/0141397 A1 | 6/2013 | Dunagan |
| 2013/0155655 A1 | 6/2013 | Lee et al. |
| 2013/0155723 A1 | 6/2013 | Coleman |
| 2013/0158504 A1 | 6/2013 | Ruchti et al. |
| 2013/0162588 A1 | 6/2013 | Wen |
| 2013/0181896 A1 | 7/2013 | Gruhlke et al. |
| 2013/0181908 A1 | 7/2013 | Santiago et al. |
| 2013/0181953 A1 | 7/2013 | Hinckley et al. |
| 2013/0187891 A1 | 7/2013 | Eriksson et al. |
| 2013/0187957 A1 | 7/2013 | Andersson et al. |
| 2013/0201142 A1 | 8/2013 | Suarez Rovere |
| 2013/0205963 A1 | 8/2013 | Prochello et al. |
| 2013/0208506 A1 | 8/2013 | Ye et al. |
| 2013/0222344 A1 | 8/2013 | Lu et al. |
| 2013/0222346 A1 | 8/2013 | Chen et al. |
| 2013/0229357 A1 | 9/2013 | Powell et al. |
| 2013/0234991 A1 | 9/2013 | Sparf |
| 2013/0241886 A1 | 9/2013 | Eriksson et al. |
| 2013/0241887 A1 | 9/2013 | Sharma |
| 2013/0250354 A1 | 9/2013 | Kato et al. |
| 2013/0254314 A1 | 9/2013 | Chow |
| 2013/0257793 A1 | 10/2013 | Zeliff et al. |
| 2013/0257810 A1 | 10/2013 | Niu et al. |
| 2013/0263042 A1 | 10/2013 | Buening |
| 2013/0263240 A1 | 10/2013 | Moskovitch |
| 2013/0269867 A1 | 10/2013 | Trott |
| 2013/0271487 A1 | 10/2013 | Lincoln |
| 2013/0275082 A1 | 10/2013 | Follmer et al. |
| 2013/0279190 A1 | 10/2013 | Huang |
| 2013/0285920 A1 | 10/2013 | Colley |
| 2013/0285977 A1 | 10/2013 | Baharav et al. |
| 2013/0300714 A1 | 11/2013 | Goh et al. |
| 2013/0307795 A1 | 11/2013 | Suarez Rovere |
| 2013/0307796 A1 | 11/2013 | Liu et al. |
| 2013/0321740 A1 | 12/2013 | An et al. |
| 2013/0328790 A1 | 12/2013 | Liu et al. |
| 2014/0015803 A1 | 1/2014 | Drumm |
| 2014/0028575 A1 | 1/2014 | Parivar et al. |
| 2014/0028604 A1 | 1/2014 | Morinaga et al. |
| 2014/0028629 A1 | 1/2014 | Drumm et al. |
| 2014/0032735 A1 | 1/2014 | Kapoor |
| 2014/0035836 A1 | 2/2014 | Cui et al. |
| 2014/0036203 A1 | 2/2014 | Guillou et al. |
| 2014/0063853 A1 | 3/2014 | Nichol et al. |
| 2014/0071653 A1 | 3/2014 | Thompson et al. |
| 2014/0085241 A1 | 3/2014 | Christiansson et al. |
| 2014/0092052 A1 | 4/2014 | Grunthaner et al. |
| 2014/0098032 A1 | 4/2014 | Ng et al. |
| 2014/0104190 A1 | 4/2014 | Davidson |
| 2014/0104195 A1 | 4/2014 | Davidson |
| 2014/0109219 A1 | 4/2014 | Rohrweck et al. |
| 2014/0111416 A1 | 4/2014 | Sugiura |
| 2014/0111478 A1 | 4/2014 | Lin et al. |
| 2014/0111480 A1 | 4/2014 | Kim et al. |
| 2014/0118295 A1 | 5/2014 | Motoi |
| 2014/0139467 A1 | 5/2014 | Ghosh et al. |
| 2014/0149880 A1 | 5/2014 | Farouki |
| 2014/0160762 A1 | 6/2014 | Dudik et al. |
| 2014/0168153 A1 | 6/2014 | Deichmann et al. |
| 2014/0192023 A1 | 7/2014 | Hoffman |
| 2014/0204036 A1 | 7/2014 | Schillings et al. |
| 2014/0210793 A1 | 7/2014 | Eriksson et al. |
| 2014/0218467 A1 | 8/2014 | You et al. |
| 2014/0225868 A1 | 8/2014 | Huang et al. |
| 2014/0226084 A1 | 8/2014 | Utukuri et al. |
| 2014/0226266 A1 | 8/2014 | Kang et al. |
| 2014/0232669 A1 | 8/2014 | Ohlsson et al. |
| 2014/0237401 A1 | 8/2014 | Krus et al. |
| 2014/0237408 A1 | 8/2014 | Ohlsson et al. |
| 2014/0237422 A1 | 8/2014 | Ohlsson et al. |
| 2014/0253514 A1 | 9/2014 | Omura et al. |
| 2014/0253520 A1 | 9/2014 | Cueto et al. |
| 2014/0259029 A1 | 9/2014 | Choi et al. |
| 2014/0267147 A1 | 9/2014 | Buelow et al. |
| 2014/0292690 A1 | 10/2014 | Sugihara |
| 2014/0300572 A1 | 10/2014 | Ohlsson et al. |
| 2014/0324953 A1 | 10/2014 | Seo et al. |
| 2014/0362046 A1 | 12/2014 | Yoshida |
| 2014/0362053 A1 | 12/2014 | Holmgren et al. |
| 2014/0362404 A1 | 12/2014 | Miyasaka |
| 2014/0367873 A1 | 12/2014 | Yang et al. |
| 2014/0380193 A1 | 12/2014 | Coplen et al. |
| 2015/0002386 A1 | 1/2015 | Mankowski et al. |
| 2015/0002470 A1 | 1/2015 | Zhu et al. |
| 2015/0009687 A1 | 1/2015 | Lin |
| 2015/0015497 A1 | 1/2015 | Leigh |
| 2015/0026630 A1 | 1/2015 | Bullock |
| 2015/0035774 A1 | 2/2015 | Christiansson et al. |
| 2015/0035803 A1 | 2/2015 | Wassvik et al. |
| 2015/0054791 A1 | 2/2015 | Omura |
| 2015/0062021 A1 | 3/2015 | Skaljak et al. |
| 2015/0062085 A1 | 3/2015 | Lu et al. |
| 2015/0070327 A1 | 3/2015 | Hsieh et al. |
| 2015/0091832 A1 | 4/2015 | Mizunuma et al. |
| 2015/0092233 A1 | 4/2015 | Park et al. |
| 2015/0103013 A9 | 4/2015 | Huang |
| 2015/0103051 A1 | 4/2015 | Wyrwas et al. |
| 2015/0109403 A1 | 4/2015 | Krishnan et al. |
| 2015/0121691 A1 | 5/2015 | Wang |
| 2015/0131010 A1* | 5/2015 | Sugiyama ............ G06F 3/0428 349/12 |
| 2015/0138161 A1 | 5/2015 | Wassvik |
| 2015/0154291 A1 | 6/2015 | Shepherd et al. |
| 2015/0160851 A1 | 6/2015 | Michihata et al. |
| 2015/0169948 A1 | 6/2015 | Motoi |
| 2015/0193141 A1 | 7/2015 | Goldsmith et al. |
| 2015/0193585 A1 | 7/2015 | Sunna |
| 2015/0194668 A1 | 7/2015 | Ueda et al. |
| 2015/0199071 A1 | 7/2015 | Hou |
| 2015/0212607 A1 | 7/2015 | Miller et al. |
| 2015/0215450 A1 | 7/2015 | Seo et al. |
| 2015/0227261 A1 | 8/2015 | Huang et al. |
| 2015/0242055 A1 | 8/2015 | Wallander |
| 2015/0253568 A1 | 9/2015 | Kobayashi |
| 2015/0256658 A1 | 9/2015 | Shin et al. |
| 2015/0261323 A1 | 9/2015 | Cui et al. |
| 2015/0261375 A1 | 9/2015 | Leigh et al. |
| 2015/0271481 A1 | 9/2015 | Guthrie et al. |
| 2015/0277663 A1 | 10/2015 | Goertz et al. |
| 2015/0286698 A1 | 10/2015 | Gagnier et al. |
| 2015/0286810 A1 | 10/2015 | Lebert |
| 2015/0288327 A1 | 10/2015 | Cherukupalli et al. |
| 2015/0293600 A1 | 10/2015 | Sears |
| 2015/0302026 A1 | 10/2015 | Nam et al. |
| 2015/0309662 A1 | 10/2015 | Wyrwas et al. |
| 2015/0309765 A1 | 10/2015 | Nagahara |
| 2015/0324028 A1 | 11/2015 | Wassvik et al. |
| 2015/0325848 A1 | 11/2015 | Yamashita et al. |
| 2015/0331461 A1 | 11/2015 | Delano et al. |
| 2015/0331545 A1 | 11/2015 | Wassvik et al. |
| 2015/0332655 A1 | 11/2015 | Krus et al. |
| 2015/0334138 A1 | 11/2015 | Conklin et al. |
| 2015/0334139 A1 | 11/2015 | Conklin et al. |
| 2015/0339000 A1 | 11/2015 | Lee et al. |
| 2015/0346856 A1 | 12/2015 | Wassvik |
| 2015/0363041 A1 | 12/2015 | Zeliff et al. |
| 2015/0363042 A1 | 12/2015 | Krus et al. |
| 2015/0373864 A1 | 12/2015 | Jung |
| 2016/0004898 A1 | 1/2016 | Holz |
| 2016/0021833 A1 | 1/2016 | Nishimura et al. |
| 2016/0026297 A1 | 1/2016 | Shinkai et al. |
| 2016/0034109 A1 | 2/2016 | Cho et al. |
| 2016/0041629 A1 | 2/2016 | Rao et al. |
| 2016/0050263 A1 | 2/2016 | Hwang et al. |
| 2016/0050746 A1 | 2/2016 | Wassvik et al. |
| 2016/0056471 A1 | 2/2016 | Sugimori et al. |
| 2016/0062549 A1 | 3/2016 | Drumm et al. |
| 2016/0065633 A1 | 3/2016 | Kawakubo |
| 2016/0070416 A1 | 3/2016 | Wassvik |
| 2016/0077616 A1 | 3/2016 | Durojaiye et al. |
| 2016/0092021 A1 | 3/2016 | Tu et al. |
| 2016/0098148 A1 | 4/2016 | Gandra et al. |

(56) References Cited

U.S. PATENT DOCUMENTS

| | | |
|---|---|---|
| 2016/0098152 A1 | 4/2016 | Drumm et al. |
| 2016/0117019 A1 | 4/2016 | Takeda |
| 2016/0124546 A1 | 5/2016 | Chen et al. |
| 2016/0147375 A1 | 5/2016 | Bok et al. |
| 2016/0154532 A1 | 6/2016 | Campbell |
| 2016/0179261 A1 | 6/2016 | Drumm |
| 2016/0195975 A1 | 7/2016 | Baum et al. |
| 2016/0202801 A1 | 7/2016 | Odagiri et al. |
| 2016/0202841 A1 | 7/2016 | Christiansson et al. |
| 2016/0209886 A1 | 7/2016 | Suh et al. |
| 2016/0210306 A1 | 7/2016 | Kumarasamy et al. |
| 2016/0216844 A1 | 7/2016 | Bergström |
| 2016/0227381 A1 | 8/2016 | Bargetzi et al. |
| 2016/0231833 A1 | 8/2016 | Gu et al. |
| 2016/0239153 A1 | 8/2016 | Holmgren et al. |
| 2016/0246390 A1 | 8/2016 | Lukanc et al. |
| 2016/0253568 A1 | 9/2016 | Idzik et al. |
| 2016/0255713 A1 | 9/2016 | Kim et al. |
| 2016/0269329 A1 | 9/2016 | Willis |
| 2016/0295711 A1 | 10/2016 | Ryu et al. |
| 2016/0299583 A1 | 10/2016 | Watanabe |
| 2016/0306501 A1 | 10/2016 | Drumm et al. |
| 2016/0328090 A1 | 11/2016 | Klinghult |
| 2016/0342282 A1 | 11/2016 | Wassvik |
| 2017/0031516 A1 | 2/2017 | Sugiyama et al. |
| 2017/0075476 A1 | 3/2017 | Kwon et al. |
| 2017/0075484 A1 | 3/2017 | Kali et al. |
| 2017/0075494 A1 | 3/2017 | Kwon et al. |
| 2017/0083164 A1 | 3/2017 | Sheng et al. |
| 2017/0094224 A1 | 3/2017 | Hasegawa et al. |
| 2017/0115823 A1 | 4/2017 | Huang et al. |
| 2017/0123257 A1 | 5/2017 | Zhao |
| 2017/0131846 A1 | 5/2017 | Huitema |
| 2017/0147105 A1 | 5/2017 | Kwon et al. |
| 2017/0153763 A1 | 6/2017 | Vavra et al. |
| 2017/0160871 A1 | 6/2017 | Drumm |
| 2017/0185186 A1 | 6/2017 | Liu |
| 2017/0185230 A1 | 6/2017 | Wallander et al. |
| 2017/0185269 A1 | 6/2017 | Anttila et al. |
| 2017/0192493 A1 | 7/2017 | Ofek et al. |
| 2017/0205995 A1 | 7/2017 | Johansson |
| 2017/0220204 A1 | 8/2017 | Huang et al. |
| 2017/0235537 A1 | 8/2017 | Liu et al. |
| 2017/0237871 A1 | 8/2017 | Fan |
| 2017/0242579 A1 | 8/2017 | Poon et al. |
| 2017/0249030 A1 | 8/2017 | Park et al. |
| 2017/0264865 A1 | 9/2017 | Huangfu |
| 2017/0277355 A1 | 9/2017 | Kang |
| 2017/0285789 A1 | 10/2017 | Barel |
| 2017/0318115 A1 | 11/2017 | Peng et al. |
| 2018/0049014 A1 | 2/2018 | Patil et al. |
| 2018/0062158 A1 | 3/2018 | Kim et al. |
| 2018/0074654 A1 | 3/2018 | Tanaka et al. |
| 2018/0107373 A1 | 4/2018 | Cheng |
| 2018/0113569 A1 | 4/2018 | Pommier et al. |
| 2018/0129311 A1 | 5/2018 | Westhues et al. |
| 2018/0136787 A1 | 5/2018 | Echols et al. |
| 2018/0136788 A1 | 5/2018 | He et al. |
| 2018/0149792 A1 | 5/2018 | Lee et al. |
| 2018/0168153 A1 | 6/2018 | Chen et al. |
| 2018/0204877 A1 | 7/2018 | Jalili et al. |
| 2018/0205989 A1 | 7/2018 | Srinivasan et al. |
| 2018/0225006 A1 | 8/2018 | Wall |
| 2018/0235017 A1 | 8/2018 | Sakamoto |
| 2018/0253187 A1 | 9/2018 | Christiansson et al. |
| 2018/0275830 A1 | 9/2018 | Christiansson et al. |
| 2018/0275836 A1 | 9/2018 | Hermans et al. |
| 2018/0279454 A1 | 9/2018 | Takeshita et al. |
| 2018/0293436 A1 | 10/2018 | Jeon et al. |
| 2018/0314206 A1 | 11/2018 | Lee et al. |
| 2018/0349014 A1 | 12/2018 | Samuel et al. |
| 2019/0004668 A1 | 1/2019 | Jeong et al. |
| 2019/0012027 A1 | 1/2019 | Park et al. |
| 2019/0025977 A1 | 1/2019 | Christiansson et al. |
| 2019/0025984 A1 * | 1/2019 | Weilbacher ............ G02B 6/102 |
| 2019/0050074 A1 | 2/2019 | Kocovski |
| 2019/0065030 A1 | 2/2019 | Kang et al. |
| 2019/0079638 A1 | 3/2019 | Kocovski et al. |
| 2019/0107923 A1 | 4/2019 | Drumm |
| 2019/0146630 A1 | 5/2019 | Chen et al. |
| 2019/0155495 A1 | 5/2019 | Klein et al. |
| 2019/0196660 A1 * | 6/2019 | Skagmo ............... G06F 3/0428 |
| 2019/0227670 A1 | 7/2019 | O'Cleirigh et al. |
| 2019/0235665 A1 | 8/2019 | Kim et al. |
| 2019/0235701 A1 | 8/2019 | Han et al. |
| 2019/0250755 A1 | 8/2019 | Liu et al. |
| 2019/0250769 A1 | 8/2019 | Wallander |
| 2019/0258353 A1 | 8/2019 | Drumm et al. |
| 2019/0265941 A1 | 8/2019 | Baba |
| 2019/0272052 A1 | 9/2019 | Wallander et al. |
| 2019/0324570 A1 | 10/2019 | Kolundzija et al. |
| 2019/0377431 A1 | 12/2019 | Drumm |
| 2019/0377435 A1 | 12/2019 | Piot et al. |
| 2020/0006761 A1 | 1/2020 | Fujino et al. |
| 2020/0012359 A1 | 1/2020 | Jakobson et al. |
| 2020/0012408 A1 | 1/2020 | Drumm et al. |
| 2020/0064937 A1 | 2/2020 | Wassvik et al. |
| 2020/0073509 A1 | 3/2020 | Shih et al. |
| 2020/0098147 A1 | 3/2020 | Ha et al. |
| 2020/0125189 A1 | 4/2020 | Kim et al. |
| 2020/0159382 A1 | 5/2020 | Drumm |
| 2020/0167033 A1 | 5/2020 | Kim et al. |
| 2020/0173050 A1 | 6/2020 | Curran et al. |
| 2020/0174644 A1 | 6/2020 | Weibull et al. |
| 2020/0177742 A1 | 6/2020 | Homma et al. |
| 2020/0249777 A1 | 8/2020 | Hou et al. |
| 2020/0293136 A1 | 9/2020 | Jakobson et al. |
| 2020/0310621 A1 | 10/2020 | Piot et al. |
| 2020/0341587 A1 | 10/2020 | Drumm |
| 2020/0348473 A1 | 11/2020 | Drumm |
| 2020/0348817 A1 | 11/2020 | Ohlsson et al. |
| 2020/0387237 A1 | 12/2020 | Drumm |
| 2021/0013496 A1 | 1/2021 | Tsuzuki et al. |
| 2021/0026587 A1 | 1/2021 | Christiansson et al. |
| 2021/0041970 A1 | 2/2021 | Bergstrm et al. |
| 2021/0050086 A1 | 2/2021 | Rose et al. |
| 2021/0081071 A1 | 3/2021 | Koh et al. |
| 2021/0089164 A1 | 3/2021 | Christiansson et al. |
| 2021/0096604 A1 | 4/2021 | Curran et al. |
| 2022/0035481 A1 | 2/2022 | Bergstrm et al. |
| 2022/0109809 A1 | 4/2022 | Wassvik et al. |
| 2022/0221955 A1 | 7/2022 | Bergström et al. |
| 2022/0413652 A1 | 12/2022 | Andersson et al. |
| 2023/0009306 A1 | 1/2023 | Andreasson |
| 2023/0057020 A1 | 2/2023 | Wassvik |
| 2023/0082401 A1 | 3/2023 | Andreasson et al. |
| 2023/0168774 A1 | 6/2023 | Kocovski et al. |
| 2023/0168775 A1 | 6/2023 | Skagmo et al. |
| 2023/0229266 A1 | 7/2023 | Bergström et al. |
| 2023/0359309 A1 | 11/2023 | Bergström et al. |
| 2023/0393692 A1 | 12/2023 | Krus |
| 2023/0400948 A1 | 12/2023 | Bergström et al. |
| 2024/0004501 A1 | 1/2024 | Bergström et al. |

FOREIGN PATENT DOCUMENTS

| | | |
|---|---|---|
| CA | 2745422 A1 | 6/2010 |
| CA | 2762681 A1 | 7/2012 |
| CN | 1794157 A | 6/2006 |
| CN | 101019071 A | 8/2007 |
| CN | 101075168 A | 11/2007 |
| CN | 101174191 A | 5/2008 |
| CN | 101206550 A | 6/2008 |
| CN | 201233592 Y | 5/2009 |
| CN | 101644854 A | 2/2010 |
| CN | 201437963 U | 4/2010 |
| CN | 201465071 U | 5/2010 |
| CN | 101882034 A | 11/2010 |
| CN | 102117155 A | 7/2011 |
| CN | 102929449 A | 2/2013 |
| CN | 202887145 U | 4/2013 |
| CN | 103123556 A | 5/2013 |
| CN | 203189466 U | 9/2013 |
| CN | 203224848 U | 10/2013 |

(56) References Cited

FOREIGN PATENT DOCUMENTS

| | | |
|---|---|---|
| CN | 203453994 U | 2/2014 |
| CN | 102414646 B | 4/2014 |
| CN | 203720812 U | 7/2014 |
| CN | 203786707 U | 8/2014 |
| CN | 203786708 U | 8/2014 |
| CN | 203825586 U | 9/2014 |
| CN | 104391611 A | 3/2015 |
| CN | 204288179 U | 4/2015 |
| CN | 104808843 A | 7/2015 |
| CN | 204695282 U | 10/2015 |
| CN | 105183241 A1 | 12/2015 |
| CN | 205015574 U | 2/2016 |
| CN | 205384833 U | 7/2016 |
| CN | 106648222 A | 5/2017 |
| CN | 206400503 U | 8/2017 |
| CN | 105320382 B | 4/2021 |
| CN | 113010053 A | 6/2021 |
| DE | 3511330 A1 | 10/1986 |
| DE | 68902419 T2 | 3/1993 |
| DE | 69000920 T2 | 6/1993 |
| DE | 19809934 A1 | 9/1999 |
| DE | 10026201 A1 | 12/2000 |
| DE | 10025175 A1 | 12/2001 |
| DE | 102009003990 A1 | 7/2010 |
| DE | 102010000473 A1 | 8/2010 |
| EP | 0600576 A1 | 6/1994 |
| EP | 0845812 A2 | 6/1998 |
| EP | 0897161 A1 | 2/1999 |
| EP | 0931731 A1 | 7/1999 |
| EP | 1126236 A1 | 8/2001 |
| EP | 1457870 A2 | 9/2004 |
| EP | 1471459 A2 | 10/2004 |
| EP | 1512989 A2 | 3/2005 |
| EP | 1798630 A2 | 6/2007 |
| EP | 1835464 A1 | 9/2007 |
| EP | 2077490 A2 | 7/2009 |
| EP | 2088501 A1 | 8/2009 |
| EP | 2314203 A1 | 4/2011 |
| EP | 2325735 A2 | 5/2011 |
| EP | 2339437 A2 | 6/2011 |
| EP | 0985206 B1 | 3/2012 |
| EP | 2442180 A1 | 4/2012 |
| EP | 2466428 A2 | 6/2012 |
| EP | 2466429 A1 | 6/2012 |
| EP | 2479642 A1 | 7/2012 |
| EP | 2515216 A1 | 10/2012 |
| EP | 2565770 A2 | 3/2013 |
| EP | 2765622 A2 | 8/2014 |
| EP | 2778849 A1 | 9/2014 |
| EP | 2797143 A1 | 10/2014 |
| EP | 2840470 A2 | 2/2015 |
| EP | 3002666 A1 | 4/2016 |
| EP | 3043242 A1 | 7/2016 |
| EP | 3535640 A1 | 9/2019 |
| EP | 3537269 A1 | 9/2019 |
| EP | 3644167 A1 | 4/2020 |
| FR | 2172828 A1 | 10/1973 |
| FR | 2617619 A1 | 1/1989 |
| FR | 2617620 A1 | 1/1989 |
| FR | 2614711 B1 | 3/1992 |
| FR | 2676275 A1 | 11/1992 |
| GB | 1380144 A | 1/1975 |
| GB | 2131544 A | 6/1984 |
| GB | 2204126 A | 11/1988 |
| GB | 2263765 A | 8/1993 |
| GB | 2472444 A | 2/2011 |
| JP | 62-159213 A | 7/1987 |
| JP | 05-190066 A | 7/1993 |
| JP | 2000-506655 A | 5/2000 |
| JP | 2000-172438 A | 6/2000 |
| JP | 2000-259334 A | 9/2000 |
| JP | 2000-268824 A | 9/2000 |
| JP | 2000-293311 A | 10/2000 |
| JP | 2003-330603 A | 11/2003 |
| JP | 2005-004278 A | 1/2005 |
| JP | 2008-506173 A | 2/2008 |
| JP | 2009-004139 A | 1/2009 |
| JP | 2009-543173 A | 12/2009 |
| JP | 2010-238426 A | 10/2010 |
| JP | 2011-530124 A | 12/2011 |
| JP | 2015-038862 A | 2/2015 |
| JP | 2015-049965 A | 3/2015 |
| JP | 2015-158831 A | 9/2015 |
| JP | 2016-192688 A | 11/2016 |
| JP | 6211595 B2 | 10/2017 |
| KR | 10-2001-0060254 A | 7/2001 |
| KR | 10-0359400 B1 | 10/2002 |
| KR | 10-0940435 B1 | 2/2010 |
| KR | 10-1081586 B1 | 11/2011 |
| KR | 10-1319543 B1 | 10/2013 |
| KR | 10-2015-0125374 A | 11/2015 |
| KR | 10-2016-0075643 A | 6/2016 |
| TW | M517370 U | 2/2016 |
| WO | 84/03186 A1 | 8/1984 |
| WO | 95/27919 A2 | 10/1995 |
| WO | 96/10148 A1 | 4/1996 |
| WO | 96/23649 A1 | 8/1996 |
| WO | 99/46602 A1 | 9/1999 |
| WO | 00/50807 A1 | 8/2000 |
| WO | 01/20781 A1 | 3/2001 |
| WO | 01/27867 A1 | 4/2001 |
| WO | 01/71654 A1 | 9/2001 |
| WO | 01/84251 A2 | 11/2001 |
| WO | 02/07072 A2 | 1/2002 |
| WO | 02/35460 A1 | 5/2002 |
| WO | 02/77915 A2 | 10/2002 |
| WO | 02/95668 A1 | 11/2002 |
| WO | 03/41006 A1 | 5/2003 |
| WO | 03/76870 A1 | 9/2003 |
| WO | 2004/032210 A2 | 4/2004 |
| WO | 2004/081502 A2 | 9/2004 |
| WO | 2004/081956 A2 | 9/2004 |
| WO | 2005/026938 A2 | 3/2005 |
| WO | 2005/029172 A1 | 3/2005 |
| WO | 2005/029395 A2 | 3/2005 |
| WO | 2005/125011 A1 | 12/2005 |
| WO | 2006/003245 A1 | 1/2006 |
| WO | 2006/081633 A1 | 8/2006 |
| WO | 2006/095320 A2 | 9/2006 |
| WO | 2006/124551 A2 | 11/2006 |
| WO | 2007/003196 A2 | 1/2007 |
| WO | 2007/047685 A2 | 4/2007 |
| WO | 2007/058924 A2 | 5/2007 |
| WO | 2007/112742 A1 | 10/2007 |
| WO | 2008/004097 A2 | 1/2008 |
| WO | 2008/004103 A2 | 1/2008 |
| WO | 2008/007276 A2 | 1/2008 |
| WO | 2008/007372 A1 | 1/2008 |
| WO | 2008/017077 A2 | 2/2008 |
| WO | 2008/032270 A2 | 3/2008 |
| WO | 2008/034184 A1 | 3/2008 |
| WO | 2008/038066 A1 | 4/2008 |
| WO | 2008/039006 A1 | 4/2008 |
| WO | 2008/044024 A2 | 4/2008 |
| WO | 2008/068607 A2 | 6/2008 |
| WO | 2009/000289 A1 | 12/2008 |
| WO | 2009/007704 A1 | 1/2009 |
| WO | 2009/029764 A1 | 3/2009 |
| WO | 2009/048365 A1 | 4/2009 |
| WO | 2009/077962 A2 | 6/2009 |
| WO | 2009/102681 A2 | 8/2009 |
| WO | 2009/135320 A1 | 11/2009 |
| WO | 2009/137355 A2 | 11/2009 |
| WO | 2010/006882 A2 | 1/2010 |
| WO | 2010/006883 A2 | 1/2010 |
| WO | 2010/006884 A2 | 1/2010 |
| WO | 2010/006885 A2 | 1/2010 |
| WO | 2010/006886 A2 | 1/2010 |
| WO | 2010/015408 A1 | 2/2010 |
| WO | 2010/015410 A2 | 2/2010 |
| WO | 2010/046539 A1 | 4/2010 |
| WO | 2010/056177 A1 | 5/2010 |
| WO | 2010/064983 A2 | 6/2010 |
| WO | 2010/081702 A2 | 7/2010 |

(56) References Cited

FOREIGN PATENT DOCUMENTS

| | | |
|---|---|---|
| WO | 2010/112404 A1 | 10/2010 |
| WO | 2010/123809 A2 | 10/2010 |
| WO | 2010/134865 A1 | 11/2010 |
| WO | 2011/028169 A1 | 3/2011 |
| WO | 2011/028170 A1 | 3/2011 |
| WO | 2011/031215 A1 | 3/2011 |
| WO | 2011/049511 A1 | 4/2011 |
| WO | 2011/049512 A1 | 4/2011 |
| WO | 2011/049513 A1 | 4/2011 |
| WO | 2011/057572 A1 | 5/2011 |
| WO | 2011/078769 A1 | 6/2011 |
| WO | 2011/082477 A1 | 7/2011 |
| WO | 2011/104673 A1 | 9/2011 |
| WO | 2011/119483 A1 | 9/2011 |
| WO | 2011/139213 A1 | 11/2011 |
| WO | 2012/002894 A1 | 1/2012 |
| WO | 2012/005051 A1 | 1/2012 |
| WO | 2012/010078 A1 | 1/2012 |
| WO | 2012/012165 A1 | 1/2012 |
| WO | 2012/015810 A2 | 2/2012 |
| WO | 2012/018176 A2 | 2/2012 |
| WO | 2012/050510 A1 | 4/2012 |
| WO | 2012/082055 A1 | 6/2012 |
| WO | 2012/105893 A1 | 8/2012 |
| WO | 2012/121652 A1 | 9/2012 |
| WO | 2012/158105 A2 | 11/2012 |
| WO | 2012/171181 A1 | 12/2012 |
| WO | 2012/172302 A1 | 12/2012 |
| WO | 2012/176801 A1 | 12/2012 |
| WO | 2013/011571 A1 | 1/2013 |
| WO | 2013/014534 A2 | 1/2013 |
| WO | 2013/036192 A1 | 3/2013 |
| WO | 2013/048312 A2 | 4/2013 |
| WO | 2013/055282 A2 | 4/2013 |
| WO | 2013/062471 A2 | 5/2013 |
| WO | 2013/089622 A2 | 6/2013 |
| WO | WO 2013/081818 | 6/2013 |
| WO | 2013/108031 A2 | 7/2013 |
| WO | 2013/115710 A2 | 8/2013 |
| WO | 2013/126005 A2 | 8/2013 |
| WO | 2013/133756 A1 | 9/2013 |
| WO | 2013/133757 A2 | 9/2013 |
| WO | WO 2013/138003 | 9/2013 |
| WO | 2013/159472 A1 | 10/2013 |
| WO | 2013/165305 A2 | 11/2013 |
| WO | 2013/165306 A2 | 11/2013 |
| WO | 2013/176613 A2 | 11/2013 |
| WO | 2013/176614 A2 | 11/2013 |
| WO | 2013/176615 A2 | 11/2013 |
| WO | 2013/191638 A1 | 12/2013 |
| WO | 2014/016685 A1 | 1/2014 |
| WO | 2014/017973 A1 | 1/2014 |
| WO | WO 2014/027241 A2 | 2/2014 |
| WO | 2014/037963 A1 | 3/2014 |
| WO | 2014/044181 A1 | 3/2014 |
| WO | 2014/055809 A1 | 4/2014 |
| WO | 2014/065601 A1 | 5/2014 |
| WO | 2014/086084 A1 | 6/2014 |
| WO | 2014/093937 A1 | 6/2014 |
| WO | 2014/098740 A1 | 6/2014 |
| WO | 2014/098742 A1 | 6/2014 |
| WO | 2014/098743 A1 | 6/2014 |
| WO | 2014/098744 A1 | 6/2014 |
| WO | 2014/104967 A1 | 7/2014 |
| WO | 2014/130515 A1 | 8/2014 |
| WO | 2014/131221 A1 | 9/2014 |
| WO | 2015/029350 A1 | 3/2015 |
| WO | 2015/084644 A1 | 6/2015 |
| WO | 2015/123322 A1 | 8/2015 |
| WO | 2015/175586 A1 | 11/2015 |
| WO | 2015/199602 A1 | 12/2015 |
| WO | 2016/130074 A1 | 8/2016 |
| WO | 2016/160745 A1 | 10/2016 |
| WO | 2016/177592 A1 | 11/2016 |
| WO | 2017/026821 A1 | 2/2017 |
| WO | 2017/099657 A1 | 6/2017 |
| WO | WO 2017/138863 | 8/2017 |
| WO | 2018/003929 A1 | 1/2018 |
| WO | 2018/096430 A1 | 5/2018 |
| WO | 2018/106172 A1 | 6/2018 |
| WO | WO 2018/106176 | 6/2018 |
| WO | 2018/141948 A1 | 8/2018 |
| WO | WO 2018/182476 | 10/2018 |
| WO | 2019/045629 A1 | 3/2019 |
| WO | 2019/156609 A1 | 8/2019 |
| WO | 2019/172826 A1 | 9/2019 |
| WO | 2019/172827 A1 | 9/2019 |
| WO | 2020/022096 A1 | 1/2020 |
| WO | 2020/078339 A1 | 4/2020 |
| WO | 2020/078749 A1 | 4/2020 |
| WO | 2020/168802 A1 | 8/2020 |

OTHER PUBLICATIONS

International Preliminary Report on Patentability received for PCT Patent Application No. PCT/SE2021/050095, mailed on Aug. 18, 2022, 11 pages.
International Preliminary Report on Patentability received for PCT Patent Application No. PCT/SE2021/051018, mailed on May 4, 2023, 8 pages.
International Preliminary Report on Patentability received for PCT Patent Application No. PCT/SE2021/051151, mailed on Jun. 1, 2023, 10 pages.
International Preliminary Report on Patentability received for PCT Patent Application No. PCT/SE22/050139, mailed on Aug. 24, 2023, 9 pages.
International Search Report and Written Opinion for International App. No. PCT/SE2019/050343, dated Sep. 3, 2019, in 13 pages.
International Search Report and Written Opinion issued in International Application No. PCT/SE2010/051103 dated Jan. 25, 2011.
International Search Report and Written Opinion issued in International Application No. PCT/SE2010/051105 dated Nov. 16, 2010.
International Search Report and Written Opinion issued in International Application No. PCT/SE2010/051107 dated Jan. 24, 2011.
International Search Report and Written Opinion received for PCT Patent Application No. PCT/SE2013/050064, mailed on Sep. 12, 2013, 10 pages.
International Search Report and Written Opinion received for PCT Patent Application No. PCT/SE2019/050190, mailed on Jun. 12, 2019, 11 pages.
International Search Report and Written Opinion received for PCT Patent Application No. PCT/EP2018/052757, mailed on Apr. 23, 2018, 9 pages.
International Search Report and Written Opinion received for PCT Patent Application No. PCT/EP2019/077054, mailed on Jan. 10, 2020, 9 pages.
International Search Report and Written Opinion received for PCT Patent Application No. PCT/IB2017/057201, mailed on Mar. 6, 2018, 12 pages.
International Search Report and Written Opinion received for PCT Patent Application No. PCT/JP2019/001801, mailed on Apr. 23, 2019, 13 pages (6 pages of English Translation and 7 pages of Original Document).
International Search Report and Written Opinion received for PCT Patent Application No. PCT/SE2009/051364, mailed on May 4, 2010, 15 pages.
International Search Report and Written Opinion received for PCT Patent Application No. PCT/SE2011/050520, mailed on Aug. 18, 2011, 8 pages.
International Search Report and Written Opinion received for PCT Patent Application No. PCT/SE2012/050086, mailed on May 23, 2012, 9 pages.
International Search Report and Written Opinion received for PCT Patent Application No. PCT/SE2012/051419, mailed on Aug. 26, 2013, 8 pages.
International Search Report and Written Opinion received for PCT Patent Application No. PCT/SE2013/050137, mailed on Oct. 15, 2013, 9 pages.

(56) References Cited

OTHER PUBLICATIONS

International Search Report and Written Opinion received for PCT Patent Application No. PCT/SE2013/050473, mailed on Feb. 3, 2014, 11 pages.
International Search Report and Written Opinion received for PCT Patent Application No. PCT/SE2013/050585, mailed on Jan. 21, 2014, 13 pages.
International Search Report and Written Opinion received for PCT Patent Application No. PCT/SE2013/051044, mailed on Mar. 20, 2014, 9 pages.
International Search Report and Written Opinion received for PCT Patent Application No. PCT/SE2013/051533, mailed on Apr. 15, 2014, 10 pages.
International Search Report and Written Opinion received for PCT Patent Application No. PCT/SE2013/051534, mailed on May 6, 2014, 11 pages.
International Search Report and Written Opinion received for PCT Patent Application No. PCT/SE2013/051537, mailed on Apr. 25, 2014, 12 pages.
International Search Report and Written Opinion received for PCT Patent Application No. PCT/SE2014/050435, mailed on Jun. 12, 2014, 11 pages.
International Search Report and Written Opinion received for PCT Patent Application No. PCT/SE2014/050437, mailed on Jul. 1, 2014, 9 pages.
International Search Report and Written Opinion received for PCT Patent Application No. PCT/SE2014/050438, mailed on Jul. 1, 2014, 9 pages.
International Search Report and Written Opinion received for PCT Patent Application No. PCT/SE2014/050701, mailed on Nov. 6, 2014, 11 pages.
International Search Report and Written Opinion received for PCT Patent Application No. PCT/SE2014/051363, mailed on Feb. 12, 2015, 9 pages.
International Search Report and Written Opinion received for PCT Patent Application No. PCT/SE2015/050041, mailed on Apr. 29, 2015, 12 pages.
International Search Report and Written Opinion received for PCT Patent Application No. PCT/SE2015/050042, mailed on Sep. 28, 2015, 14 pages.
International Search Report and Written Opinion received for PCT Patent Application No. PCT/SE2015/050043, mailed on May 19, 2015, 12 pages.
International Search Report and Written Opinion received for PCT Patent Application No. PCT/SE2015/050044, mailed on May 19, 2015, 11 pages.
International Search Report and Written Opinion received for PCT Patent Application No. PCT/SE2015/050724, mailed on Oct. 6, 2015, 10 pages.
International Search Report and Written Opinion received for PCT Patent Application No. PCT/SE2016/050053, mailed on May 2, 2016, 16 pages.
International Search Report and Written Opinion received for PCT Patent Application No. PCT/SE2016/050098, mailed on Jun. 29, 2016, 13 pages.
International Search Report and Written Opinion received for PCT Patent Application No. PCT/SE2016/050155, mailed on Jul. 15, 2016, 10 pages.
International Search Report and Written Opinion received for PCT Patent Application No. PCT/SE2016/051229, mailed on Mar. 10, 2017, 18 pages.
International Search Report and Written Opinion received for PCT Patent Application No. PCT/SE2017/050102, mailed on Apr. 5, 2017, 12 pages.
International Search Report and Written Opinion received for PCT Patent Application No. PCT/SE2017/051224, mailed on Feb. 23, 2018, 17 pages.
International Search Report and Written Opinion received for PCT Patent Application No. PCT/SE2017/051233, mailed on Mar. 12, 2018, 10 pages.
International Search Report and Written Opinion received for PCT Patent Application No. PCT/SE2018/050070, mailed on Apr. 25, 2018, 13 pages.
International Search Report and Written Opinion received for PCT Patent Application No. PCT/SE2018/050109, mailed on May 3, 2018, 15 pages.
International Search Report and Written Opinion received for PCT Patent Application No. PCT/SE2018/050817, mailed on Jan. 28, 2019, 12 pages.
International Search Report and Written Opinion received for PCT Patent Application No. PCT/SE2018/050896, mailed on Nov. 27, 2018, 13 pages.
International Search Report and Written Opinion received for PCT Patent Application No. PCT/SE2019/050189, mailed on May 29, 2019, 12 pages.
International Search Report and Written Opinion received for PCT Patent Application No. PCT/SE2019/050193, mailed on Apr. 10, 2019, 11 pages.
International Search Report and Written Opinion received for PCT Patent Application No. PCT/SE2019/050195, mailed on Jun. 12, 2019, 13 pages.
International Search Report and Written Opinion received for PCT Patent Application No. PCT/SE2020/050504, mailed on Sep. 4, 2020, 13 pages.
Holzammer, Andreas "Combining Diffuse Illumination and Frustrated Total Internal Reflection for touch detection", Oct. 22, 2009 (Oct. 22, 2009), Retrieved from the Internet: URL:http://www.eecs.tu-berlin.de/fileadmin/fg144/Research/Theses/Holzammer/Thesis Andreas holzammer.pdf.
Horwood, A. et al: "Image Normalization, a Basic Requirement for Computer-based Automatic Diagnostic Applications", May 1, 2001 (May 1, 2001), retrieved from the Internet: URL:http://facweb.cs.depaul.edu/research/vc/seminar/Paper/Feb22_2008Emili_1mageNormali zation.pdf*Paae 9, line 1-Paae 14, line 1.
Iizuka, K., "Boundaries, Near-Field Optics, and Near-Field Imaging," Elements of Photonics, vol. 1: In Free Space and Special Media, Wiley & Sons, 2002, in 57 pages.
International Preliminary Report on Patentability received in International Application No. PCT/SE2017/051233, dated Jun. 11, 2019, in 6 pages.
International Preliminary Report on Patentability received for PCT Patent Application No. PCT/EP2018/052757, mailed on Aug. 15, 2019, 7 pages.
International Preliminary Report on Patentability received for PCT Patent Application No. PCT/EP2019/077054, mailed on Apr. 29, 2021, 7 pages.
International Preliminary Report on Patentability received for PCT Patent Application No. PCT/IB2017/057201, mailed on Jun. 6, 2019, 8 pages.
International Preliminary Report on Patentability received for PCT Patent Application No. PCT/JP2019/001801, mailed on Oct. 15, 2020, 12 pages (6 pages of English Translation and 6 pages of Original Document).
International Preliminary Report on Patentability received for PCT Patent Application No. PCT/SE2009/051364, mailed on Jun. 16, 2011, 11 pages.
International Preliminary Report on Patentability received for PCT Patent Application No. PCT/SE2011/050520, mailed on Nov. 15, 2012, 6 pages.
International Preliminary Report on Patentability received for PCT Patent Application No. PCT/SE2011/050871, mailed on Jan. 17, 2013, 10 pages.
International Preliminary Report on Patentability received for PCT Patent Application No. PCT/SE2012/050086, mailed on Aug. 15, 2013, 8 pages.
International Preliminary Report on Patentability received for PCT Patent Application No. PCT/SE2012/051419, mailed on Jul. 3, 2014, 6 pages.
International Preliminary Report on Patentability received for PCT Patent Application No. PCT/SE2013/050064, mailed on Aug. 14, 2014, 7 pages.

(56) References Cited

OTHER PUBLICATIONS

International Preliminary Report on Patentability received for PCT Patent Application No. PCT/SE2013/050137, mailed on Sep. 4, 2014, 6 pages.
International Preliminary Report on Patentability received for PCT Patent Application No. PCT/SE2013/050473, mailed on Nov. 13, 2014, 8 pages.
International Preliminary Report on Patentability received for PCT Patent Application No. PCT/SE2013/050585, mailed on Dec. 4, 2014, 10 pages.
International Preliminary Report on Patentability received for PCT Patent Application No. PCT/SE2013/051044, mailed on Mar. 26, 2015, 7 pages.
International Preliminary Report on Patentability received for PCT Patent Application No. PCT/SE2013/051533, mailed on Jul. 2, 2015, 8 pages.
International Preliminary Report on Patentability received for PCT Patent Application No. PCT/SE2013/051534, mailed on Jul. 2, 2015, 8 pages.
International Preliminary Report on Patentability received for PCT Patent Application No. PCT/SE2013/051537, mailed on Jul. 2, 2015, 9 pages.
International Preliminary Report on Patentability received for PCT Patent Application No. PCT/SE2014/050435, mailed on Oct. 22, 2015, 8 pages.
International Preliminary Report on Patentability received for PCT Patent Application No. PCT/SE2014/050437, mailed on Oct. 22, 2015, 6 pages.
International Preliminary Report on Patentability received for PCT Patent Application No. PCT/SE2014/050438, mailed on Oct. 22, 2015, 6 pages.
International Preliminary Report on Patentability received for PCT Patent Application No. PCT/SE2014/050701, mailed on Jan. 21, 2016, 8 pages.
International Preliminary Report on Patentability received for PCT Patent Application No. PCT/SE2014/051363, mailed on Jun. 2, 2016, 6 pages.
International Preliminary Report on Patentability received for PCT Patent Application No. PCT/SE2015/050041, mailed on Jul. 28, 2016, 10 pages.
International Preliminary Report on Patentability received for PCT Patent Application No. PCT/SE2015/050042, mailed on Jul. 28, 2016, 10 pages.
International Preliminary Report on Patentability received for PCT Patent Application No. PCT/SE2015/050043, mailed on Jul. 28, 2016, 9 pages.
International Preliminary Report on Patentability received for PCT Patent Application No. PCT/SE2015/050044, mailed on Jul. 28, 2016, 8 pages.
International Preliminary Report on Patentability received for PCT Patent Application No. PCT/SE2015/050724, mailed on Jan. 5, 2017, 7 pages.
International Preliminary Report on Patentability received for PCT Patent Application No. PCT/SE2016/050053, mailed on Aug. 10, 2017, 13 pages.
International Preliminary Report on Patentability received for PCT Patent Application No. PCT/SE2016/050098, mailed on Aug. 24, 2017, 9 pages.
International Preliminary Report on Patentability received for PCT Patent Application No. PCT/SE2016/050155, mailed on Sep. 14, 2017, 7 pages.
International Preliminary Report on Patentability received for PCT Patent Application No. PCT/SE2016/051229, mailed on Jun. 21, 2018, 15 pages.
International Preliminary Report on Patentability received for PCT Patent Application No. PCT/SE2017/050102, mailed on Aug. 23, 2018, 9 pages.
International Preliminary Report on Patentability received for PCT Patent Application No. PCT/SE2017/051224, mailed on Feb. 26, 2019, 13 pages.
International Preliminary Report on Patentability received for PCT Patent Application No. PCT/SE2018/050070, mailed on Aug. 22, 2019, 10 pages.
International Preliminary Report on Patentability received for PCT Patent Application No. PCT/SE2018/050109, mailed on Oct. 10, 2019, 12 pages.
International Preliminary Report on Patentability received for PCT Patent Application No. PCT/SE2018/050817, mailed on Mar. 5, 2020, 9 pages.
International Preliminary Report on Patentability received for PCT Patent Application No. PCT/SE2018/050896, mailed on Mar. 19, 2020, 10 pages.
International Preliminary Report on Patentability received for PCT Patent Application No. PCT/SE2019/050189, mailed on Sep. 17, 2020, 9 pages.
International Preliminary Report on Patentability received for PCT Patent Application No. PCT/SE2019/050190, mailed on Sep. 17, 2020, 8 pages.
International Preliminary Report on Patentability received for PCT Patent Application No. PCT/SE2019/050193, mailed on Sep. 17, 2020, 8 pages.
International Preliminary Report on Patentability received for PCT Patent Application No. PCT/SE2019/050195, mailed on Oct. 1, 2020, 10 pages.
International Preliminary Report on Patentability received for PCT Patent Application No. PCT/SE2019/050953, mailed on Apr. 29, 2021, 11 pages.
International Preliminary Report on Patentability received for PCT Patent Application No. PCT/SE2020/050504, mailed on Dec. 2, 2021, 10 pages.
International Preliminary Report on Patentability received for PCT Patent Application No. PCT/SE2020/051117, mailed on Jun. 9, 2022, 10 pages.
International Preliminary Report on Patentability received for PCT Patent Application No. PCT/SE2020/051172, mailed on Jun. 16, 2022, 8 pages.
International Preliminary Report on Patentability received for PCT Patent Application No. PCT/SE2021/050040, mailed on Aug. 25, 2022, 13 pages.
Swedish Search Report dated Dec. 11, 2013 issued in corresponding Swedish Application No. 1350181-2.
Tedaldi, M., et al. "Refractive index mapping of layered samples using optical coherence refractometry," Proceedinas of SPIE, vol. 7171, 2009, in 8 pages.
The Laser Wall, MIT, 1997, http://web.media.mit.edu/"joep/SpectrumWeb/captions/Laser.html.
Thomas, G.L et al., "Some observations on fingerprint deposits." J. Phys. D: Appl. Phys. 8 (1975): 724-729.
Tympanus/Codrops | Animated Mesh Lines, posted on Jan. 8, 2019 by Jeremie Boulay, @ Codrops 2020 [online], [site visited Oct. 13, 2020], Available from Internet, <URL: https://tympanus.net/codrops/2019/01/08/animated-mesh-lines/>.
Ahn Y. et al., in"A slim and wide multi-touch tabletop interface and its applications," BigComp2014, IEEE, 2014, 6 pages.
Anderson, R. Rox, B.S., and John A. Parrish, M.D. "The Optics of Human Skin." Journal of Investigative Dermatology 77.1 (1981): 13-19.
ASTM International, "Standard Specification for Heat-Treated Flat Glass-Kind HS, Kind FT Coated and Uncoated Glass," Designation: C 1048-04, in 7 pages.
Barzilai et al., "Two-Point Step Size Gradient Methods", IMA Journal of Numerical Analysis, 1988, pp. 141-148.
Bose, R, "Strongly regular graphs, partial geometries and partially balanced designs", Pacific J. Math., vol. 13, No. 2 (1963), pp. 389-419.
British Standard, "Glass in building—Thermally toughened soda lime silicate safety glass," EN 12150-1:2000, ISBN 0 580 36171 3, Aug. 15, 2000, in 28 pages.
Chen. Yhun, "Using micro-structures to couple light into thin light-guides," Master Of Science Thesis, Stockholm, 2011.

(56) References Cited

OTHER PUBLICATIONS

Chou, N., et al., "Generalized pseudo-polar Fourier grids and applications in regfersting optical coherence tomography images," 43rd Asilomar Conference on Signals, Systems and Computers, Nov. 2009, in 5 pages.

Civil Cover Sheet *Flatfrog Laboratories AB v. Promethean Ltd. and Promethean Inc.*, dated Dec. 10, 2019, in 1 page.

Complaint for Patent Infringement, *Flatfrog Laboratories AB v. Promethean Ltd. and Promethean Inc.*, C.A. No. 19-2246, dated Dec. 10, 2019, in 83 pages.

Cornelissen, Hugo J et al. "Injecting Light of High-Power LEDs into Thin Light Guides." Proc. SPIE 7652. International Optical Design Conference (2010): 7652121-7652126.

Defendants Promethean Ltd. and Promethean Inc.'s Preliminary Proposed Claim Constructions, *Flatfrog Laboratories Ab v. Promethean Ltd. and Promethean Inc.*, C.A. No. 1:19-cv-02246-MN, dated May 24, 2021, in 8 pages.

Defendants' Answer to Second Amended Complaint and Defendant Promethean Inc.'s Counterclaims Against FlatFrog Laboratories Ab., C.A. No. 19-2246, dated May 22, 2020, in 29 pages.

Defendants' Initial Invalidity Contentions, *Flatfrog Laboratories AB v. Promethean Ltd. and Promethean Inc.*, C.A. No. 1:19-cv-02246-MN, dated Apr. 23, 2021, in 26 paqes.

Defendants' Sur-Reply Claim Construction Brief, *Flatfrog Laboratories AB v. Promethean Ltd. and Promethean Inc.*, C.A. No. 1:19-cv-02246-MN, dated Sep. 13, 2021, in 24 pages.

Ericson, Chris, "Real-Time Collision Detection", The Morgan Kaufmann Series in Interactive 30 Technology (2005) Chapters 5-9, pp. 125-412.

European Examination Report dated Aug. 3, 2015 issued in corresponding European Application No. 12860074.9.

European Office Action issued in European Patent Application No. 13183545, dated Feb. 12, 2014.

European Search Report dated Apr. 19, 2012 issued in European Application No. 09830665.7.

European Search Report dated Jan. 23, 2014 issued in corresponding European Appln. No. 13183545.6.

European Search Report issued in European Application No. 11777650.0, dated Nov. 22, 2013.

Executed Summons in a Civil Action to Promethean Inc., C.A. No. 19-2246, dated Dec. 10, 2019 in 2 pages.

Exhibit 1: Invalidity Claim Chart Against U.S. Pat. No. 10,775,935 Based on Prior Public Use and/or Commercial Offer for Sale of Defendant Promethean Inc.'s ActivPanel 4.5 Product, *Flatfrog Laboratories AB v. Promethean Ltd. and Promethean Inc.*, C.A. No. 1:19-cv-02246-MN, dated Apr. 23, 2021, in 26 pages.

Exhibit 10: Invalidity Claim Chart Against U.S. Pat. No. 10,739,916 Based on International App. Pub. No. W02014131221 to Chen et al., *Flatfrog Laboratories AB v. Promethean Ltd. and Promethean Inc.*, C.A. No. 1:19-cv-02246-MN, dated Apr. 23, 2021, in 26 pages.

Exhibit 11: Invalidity Claim Chart Against U.S. Pat. No. 10,739,916 Based on Chinese Pub. App. No. 104391611 A to Hu et al., *Flatfrog Laboratories AB v. Promethean Ltd. and Promethean Inc.*, C.A. No. 1:19-cv-02246-MN, dated Apr. 23, 2021, in 26 pages.

Exhibit 12: Invalidity Claim Chart Against U.S. Pat. No. 10,739,916 Based on Chinese Utility Model No. 203786708 U to Cao, *Flatfrog Laboratories AB v. Promethean Ltd. and Promethean Inc.*, C.A. No. 1:19-cv-02246-MN, dated Apr. 23, 2021, in 26 pages.

Exhibit 13: Invalidity Claim Chart Against U.S. Pat. No. 10,739,916 Based on Chinese Utility Model No. 204288179 U to Mo et al., *Flatfrog Laboratories AB v. Promethean Ltd. and Promethean Inc.*, C.A. No. 1:19-cv-02246-MN, dated Apr. 23, 2021, in 26 pages.

Exhibit 2: Invalidity Claim Chart Against U.S. Pat. No. 10,775,935 Based on U.S. Pat. No. U.S. Pre-Grant Pub. No. 2019/0235701 to Han et al., *Flatfrog Laboratories AB v. Promethean Ltd. and Promethean Inc.*, C.A. No. 1:19-cv-02246-MN, dated Apr. 23, 2021, in 26 pages.

Exhibit 3A: Invalidity Claim Chart Against U.S. Pat. No. 10,775,935 Based on U.S. Pat. No. 4,751,379 to Sasaki et al., *Flatfrog Laboratories AB v. Promethean Ltd. and Promethean Inc.*, C.A. No. 1:19-cv-02246-MN, dated Apr. 23, 2021, in 26 pages.

Exhibit 4A: Invalidity Claim Chart Against U.S. Pat. No. 10,775,935 Based on U.S. Pre-Grant Pub. No. 2019/0004668 to Jeong et al., *Flatfrog Laboratories AB v. Promethean Ltd. and Promethean Inc.*, C.A. No. 1:19-cv-02246-MN, dated Apr. 23, 2021, in 26 pages.

Exhibit 5A: Invalidity Claim Chart Against U.S. Pat. No. 10,775,935 Based on U.S. Pat. No. 9,983,626 to Cao et al., *Flatfrog Laboratories AB v. Promethean Ltd. and Promethean Inc.*, C.A. No. 1:19-cv-02246-MN, dated Apr. 23, 2021, in 26 pages.

Exhibit 6A: Invalidity Claim Chart Against U.S. Pat. No. 10,775,935 Based on U.S. Pre-Grant Pub. No. 2019/0025984 to Weilbacher et al., *Flatfrog Laboratories AB v. Promethean Ltd. and Promethean Inc.*, C.A. No. 1:19-cv-02246-MN, dated Apr. 23, 2021, in 26 pages.

Exhibit 7A: Invalidity Claim Chart Against U.S. Pat. No. 10,775,935 Based on U.S. Pat. No. 9,207,800 to Eriksson et al., *Flatfrog Laboratories AB v. Promethean Ltd. and Promethean Inc.*, C.A. No. 1:19-cv-02246-MN, dated Apr. 23, 2021, in 26 pages.

Exhibit 8: Invalidity Claim Chart Against U.S. Pat. No. 10,739,916 Based on Prior Public Use and/or Commercial Offer for Sale of Defendant Promethean Inc.'s ActivPanel 4.5 Product, *Flatfrog Laboratories AB v. Promethean Ltd. and Promethean Inc.*, C.A. No. 1:19-cv-02246-MN, dated Apr. 23, 2021, in 26 pages.

Exhibit 9: Invalidity Claim Chart Against U.S. Pat. No. 10,739,916 Based on Chinese Utility Model No. CN 203786707 U to Chen et al., *Flatfrog Laboratories AB v. Promethean Ltd. and Promethean Inc.*, C.A. No. 1:19-cv-02246-MN, dated Apr. 23, 2021, in 26 pages.

Extended (Supplementary) European Search Report dated Apr. 30, 2021, issued in counterpart EP application No. 19775915.2. (8 pages).

Extended European Search Report for European App. No. 16743795.3, dated Sep. 11, 2018, in 5 pages.

Extended European Search Report for European App. No. 18772178.2, dated Dec. 10, 2020, in 8 pages.

Extended European Search Report for European App. No. 18772370.5, dated Dec. 9, 2020, in 8 pages.

Extended European Search Report for European App. No. 18774232.5, dated Dec. 21, 2020, in 9 pages.

Extended European Search Report in European Application No. 17750516.1, dated Jul. 16, 2019 in 5 pages.

Extended European Search Report in European Application No. 19165019.1, dated Jul. 18, 2019 in 8 pages.

Extended European Search Report in European Application No. 16873465.5, date Jun. 25, 2019 in 9 pages.

Farghal, et al., "Electromagnetic Modeling of Outcoupling Efficiency and Light Emission In Near—Infrared Quantum Dot Light Emitting Devices", published in Progress In Electromagnetics Research B., vol. 24, 263-284, 2010.

Fihn, M., "Touch Panel—Special Edition," Veritas et Visus, Nov. 2011, in 1 page.

Final Office Action dated Nov. 24, 2017 in U.S. Appl. No. 14/652,757.

Final Office Action issued Nov. 30, 2017 in U.S. Appl. No. 14/652,736.

Giphy | Stickers | Closer Look Sticker by Cavan Infante, posted on May 24, 2019 by Cavan Infante, no copyright date posted [online], [site visited Oct. 13, 2020], Available from Internet, <URL: https://giphy.com/stickers/circle-underline-cavan-ZbB9ICitwN43fJvNSz/>.

Golub et al., "Matrix Computations", Third Edition, The Johns Hopkins University Press, 1996, 716 pages.

Golub et al: "Matrix Norms" in: "Matrix Computations" Aug. 21, 2005 (Aug. 21, 2005), Johns Hopkins University Press, pp. 54-59.s.

International Search Report and Written Opinion received for PCT Patent Application No. PCT/SE2020/051117, mailed on Feb. 5, 2021, 11 pages.

International Search Report and Written Opinion received for PCT Patent Application No. PCT/SE2020/051172, mailed on Feb. 4, 2021, 11 pages.

International Search Report and Written Opinion received for PCT Patent Application No. PCT/SE2021/050040, mailed on May 10, 2021, 15 pages.

(56) References Cited

OTHER PUBLICATIONS

International Search Report and Written Opinion received for PCT Patent Application No. PCT/SE2021/050095, mailed on Jun. 2, 2021, 16 pages.
International Search Report and Written Opinion received for PCT Patent Application No. PCT/SE2021/051018, mailed on Feb. 1, 2022, 10 pages.
International Search Report and Written Opinion received for PCT Patent Application No. PCT/SE2021/051151, mailed on Jan. 26, 2022, 13 pages.
International Search Report and Written Opinion received for PCT Patent Application No. PCT/SE2022/050139, mailed on Apr. 8, 2022, 12 pages.
International Search Report and Written Opinion received for PCT Patent Application No. PCT/SE2011/050871, mailed on Nov. 28, 2011, 13 pages.
International Search Report dated Sep. 25, 2015, in connection with SE 1550087-9 filed on Jan. 28, 2015.
International Search Report received for PCT Patent Application No. PCT/SE2015/050087, mailed on May 6, 2015, 4 pages.
International Search Report received for PCT Patent Application No. PCT/SE2018/050871, mailed on Jan. 25, 2019, 5 pages.
International Search Report received for PCT Patent Application No. PCT/SE2020/050043, mailed on Feb. 24, 2020, 5 pages.
International Search Report received for PCT Patent Application No. PCT/SE2021/050086, mailed Feb. 26, 2021, 6 pages.
Japanese Office Action issued in Japanese Patent Applicaiton No. 2011-539479, dated Feb. 25, 2014.
Johnson, M., "Enhanced Optical Touch Input Panel", IBM Technical Disclosure Bulletin, 1985, in 3 pages.
Joint Appendix of Exhibits to Joint Claim Construction Brief, *Flatfrog Laboratories AB* v. *Promethean Ltd. and Promethean Inc.*, C.A. No. 1:19-cv-02246-MN, dated Sep. 20, 2021, in 127 pages, (uploaded in 4 parts, part 1 of 4).
Joint Appendix of Exhibits to Joint Claim Construction Brief, *Flatfrog Laboratories AB* v. *Promethean Ltd. and Promethean Inc.*, C.A. No. 1:19-cv-02246-MN, dated Sep. 20, 2021, in 128 pages, (uploaded in 4 parts, part 4 of 4).
Joint Appendix of Exhibits to Joint Claim Construction Brief, *Flatfrog Laboratories AB* v. *Promethean Ltd. and Promethean Inc.*, C.A. No. 1:19-cv-02246-MN, dated Sep. 20, 2021, in 63 pages, (uploaded in 4 parts, part 2 of 4).
Joint Appendix of Exhibits to Joint Claim Construction Brief, *Flatfrog Laboratories AB* v. *Promethean Ltd. and Promethean Inc.*, C.A. No. 1:19-cv-02246-MN, dated Sep. 20, 2021, in 65 pages, (uploaded in 4 parts, part 3 of 4).
Joint Claim Construction Brief, *Flatfrog Laboratories AB* v. *Promethean Ltd. and Promethean Inc.*, C.A. No. 1:19-cv-02246-MN, dated Sep. 20, 2021, in 92 pages.
Joseph O'Rourke, "Computational Geometry In C", Second Edition, Cambridge University Press, (1998), pp. 252-264.
Kak, Avinash C. and Malcolm Slaney. Principles of Computerized Tomographic Imaging. New York: IEEE Press, 1988.
Kak, et al., "Principles of Computerized Tomographic Imaging", Institute of Electrical Enaineers, Inc., 1999, in 333 pages.
Kar-Han Tan, Robinson I N, Culbertson B, Apostolopoulos J, 'ConnectBoard: Enable Genuine Eye Contact and Accurate Gaze in Remote Collaboration', In: IEEE Transaction on Multimedia, Jun. 2011, vol. 13, No. 3, ISSN: 1520-9210.
Karsten Fourmont, Non-Equispaced Fast Fourier Transforms with Applications to Tomography, The Journal of Fourier Analysis and Applications, vol. 9, Issue 5, 2003, pp. 431-450.

Liu, J., et al. "Multiple touch points identifying method, involves starting touch screen, driving specific emission tube, and computing and transmitting coordinate of touch points to computer system by direct lines throuah interface of touch screen," 2007, in 25 pages.
Machine translation of KR 10-2016-0075643 (Year: 2017).
Maximilian Karl: "Entwicklung und Bau einer neuartigen Mehrfinger-Touchscreen basierend auf frustrierter Totalreflexion," Landeswettbewerb in Bayern 2008 Jugend Forscht, Apr. 1, 2008.
McBeth, "Randi, the Badly Drawn Horse", Giphy, Online Available at https://giphy.com/stories/randy-the-badly-drawn-horse-258d6753-fb29, retrieved on Aug. 24, 2023, 15 pages.
Mu, Cong et al. "Dielectric multilayer angular filters for coupling LEDs to thin light guides." Proc SPIE 8170 (2011): 817001-1-817001-10.
Naitterer, F., et al. "Fourier Reconstruction," Mathematical Methods in Image Reconstruction, Society for Industrial and Applied Mathematics, 2001, in 12 pages.
Natterer, F., "The Mathematics of Computerized Tomography", Society for Industrial and Applied Mathematics, 2001, in 240 pages.
Non-Final Office Action dated May 4, 2017 in U.S. Appl. No. 14/652,757.
Non-Final Office Action issued Jun. 14, 2018 in U.S. Appl. No. 14/652,757.
Non-Final Office Action issued Jun. 20, 2018 in U.S. Appl. No. 14/652,736.
Non-Final Office Action issued Mar. 23, 2017 in U.S. Appl. No. 14/652,736.
Notice of Service, *Flatfrog Laboratories AB* v. *Promethean Ltd. and Promethean Inc.*, C.A. No. 1:19-cv-02246-MN, dated Apr. 23, 2021, in 2 paaes.
Office Action dated Aug. 13, 2015, in connection with Sweden Application No. 1550096-0, filed Jan. 30, 2015.
Panzer, et al., "Tunable Infrared Emission From Printed Colloidal Quantum Dot/Polymer Composite Films on Flexible Substrates", published in Journal of Display Technology, vol. 6, No. 3, Mar. 2010.
Paradiso, J.A., "Several Sensor Approaches that Retrofit Large Surfaces for Interactivity," ACM Ubicomp 2002 Workshop on Collaboration with Interactive Walls and Tables, 2002, in 8 pages.
Press et al., "Numerical Recipes The Art of Scientific Computing", Third Edition, Cambridge University Press, 2007, pp. 1-1235.
Report on the Filing or Determination of an Action Regarding a Patent or Trademark. For U.S. Appl. No. 10,282,035, U.S. District of Delaware, dated Dec. 10, 2019, in 1 page.
Scheuplein, Robert J., Ph.D. "A Survey of Some Fundamental Aspects of the Absorption and Reflection of Light by Tissue." J. Soc. Cos. Chem. 15 (1964): 111-122.
Summons in a Civil Action to Promethean Inc., C.A. No. 19/2246, dated Dec. 10, 2019 in 2 pages.
Supplemental ESR dated Aug. 27, 2015 issued in corresponding EP Appin No. 13752508.
Supplementary European Search Report for European App. No. EP 16759213, dated Oct. 4, 2018, in 9 pages.
Supplementary European Search Report dated Aug. 14, 2015 issued in corresponding European Application No. 13744212.
Supplementary European Search Report for European App. No. EP 13752508, dated Aug. 27, 2015.
Supplementary European Search Report for European App. No. EP 16749542, dated Sep. 17, 2018, in 9 pages.
Swedish Search Report dated Dec. 22, 2014 issued in corresponding Swedish Application No. 1450651-3.
Communication pursuant to Article 94(3) in EP Application No. 20816652.0 dated Feb. 16, 2024.

* cited by examiner

FRAME FOR A TOUCH-SENSITIVE DEVICE AND TOOL THEREFOR

The present invention relates to a frame for a touch-sensitive device and tool therefor.

Touch-sensitive systems ("touch systems") are in widespread use in a variety of applications. Typically, the touch systems are configured to detect a touching object such as a finger or stylus, either in direct contact, or through proximity (i.e. without contact), with a touch surface. Touch systems may be used as touch pads in laptop computers, equipment control panels, and as overlays on displays e.g. hand-held devices, such as mobile telephones. A touch panel that is overlaid on or integrated in a display is also denoted a "touch screen". Many other applications are known in the art.

There are numerous known techniques for providing touch sensitivity, e.g. by incorporating resistive wire grids, capacitive sensors, strain gauges, etc. into a touch panel. There are also various types of optical touch systems, which e.g. detect attenuation of emitted light by touch objects on or proximal to a touch surface.

A known touch-sensitive apparatus is an 'above surface optical touch system', with a set of optical emitters are arranged around the periphery of a touch surface to emit light that travels above the touch surface. A set of light detectors are also arranged around the periphery of the touch surface to receive light from the set of emitters from above the touch surface. An object that touches the touch surface will attenuate the light on one or more propagation paths of the light and cause a change in the light received by one or more of the detectors. The location (coordinates), shape or area of the object may be determined by analysing the received light at the detectors. Examples of such touch systems are found in e.g. PCT/SE2017/051233 and PCT/EP2018/052757.

One component of the touch-sensitive device is a diffuser for propagating the light over the touch surface correctly. The diffuser can be an elongate piece of plastic with a surface having light diffusive properties angled to diffuse the emitted light over the touch surface. The diffuser is clipped or glued into the frame of the touch-sensitive device.

A problem with the diffuser component is that it is relatively expensive to manufacture and install. Furthermore, the diffuser must be located above the touch surface to guide and diffuse the light above the touch surface. This means that the size of the diffuser affects the size of the bezel at the end of the touch-sensitive apparatus.

In a first aspect of the invention there is provided an elongate frame for a touch-sensitive device comprising: a bottom wall, a top wall and a side wall connected therebetween; a first mounting and a second mounting for respectively fixing at least one light emitter and a touch surface with respect to the frame; and a slot at least partially positioned above the second mounting and the first mounting wherein the slot is arranged to receive an optical component.

Optionally, the optical component is a light diffuser.

Optionally, the slot is angled with respect to the side wall and the top wall such that light emitted from the emitter is diffused above the touch surface when incident on the optical component.

Optionally, the slot is angled with respect to the plane of the touch surface when mounted in the second mounting.

Optionally, the slot comprises a first lip and a second lip arranged to retain the edges of the optical component.

Optionally, the slot comprises a ridge for urging the optical component against the first and second lips. Optionally, the ridge pushes against the optical component to deform the optical component. Optionally, the ridge pushes against the optical component to cause the optical component to have a convex cross-sectional shape.

Optionally, the optical component comprises an elongate planar shape.

Optionally, the optical component is a light diffusing film.

In a second aspect of the invention, there is provided a touch-sensitive device comprising: a touch surface; at least one light emitter; a frame according to the first aspect; and an optical component mounted in the slot.

In a third aspect of the invention there is provided an optical component application tool for an elongate frame of touch-sensitive device wherein the elongate frame comprises a slot arranged to receive an optical component, the optical component application tool comprising: at least one reference surface engageable with at least a portion of the elongate frame such the slot is located in a predetermined position with respect to the at least one reference surface; and an optical component feeder aligned with respect to the at least one reference surface wherein the optical component feeder is arranged to feed the optical component into the slot.

Optionally, the tool comprises a feeding surface engageable with the optical component and the feeding surface is alignable with the slot when the elongate frame is engaged with the at least one reference surface.

Optionally, the optical component feeder pushes the optical component into the slot.

Optionally, the optical component feeder comprises at least one roller engageable with the optical component.

Optionally, the optical component is positioned between at least one roller and the feeding surface.

Optionally, the at least one roller comprises two rollers and the optical component is feedable between the two rollers.

Optionally, the optical component feeder pulls the optical component into the slot.

Optionally, the optical component feeder is fixed to the optical component.

Optionally, the optical component application tool is moveable along a longitudinal axis of the elongate frame.

Optionally, at least one coupling prevents relative movement of the optical component application tool in a plane perpendicular to the longitudinal axis of the elongate frame.

Optionally, the at least one coupling comprises an interior coupling portion having a reciprocal shape to a cross-sectional shape of the elongate frame.

In a fourth aspect of the invention there is provide a method of applying an optical component to an elongate frame of touch-sensitive device wherein the elongate frame comprises a slot arranged to receive the optical component comprising: engaging at least one reference surface with at least a portion of the elongate frame such the slot is located in a predetermined position with respect to the at least one reference surface; and feeding the optical component into the slot with an optical component feeder aligned with respect to the at least one reference surface.

Embodiments of the present invention aim to address the aforementioned problems.

Various other aspects and further embodiments are also described in the following detailed description and in the attached claims with reference to the accompanying drawings, in which:

Figure 1:
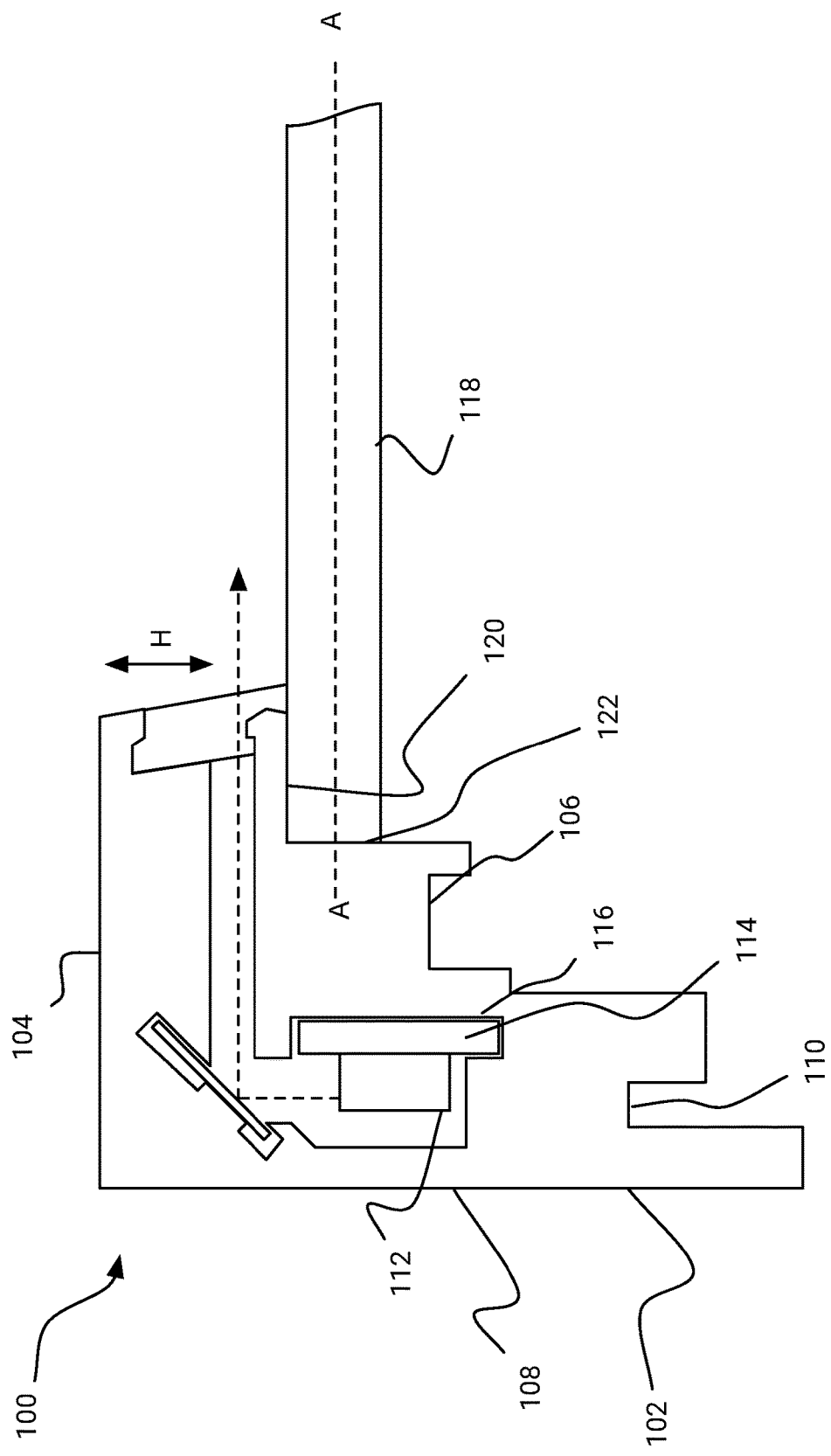
FIG. 1 shows a cross-sectional side view of an embodiment of a touch-sensitive device.
Figure 3:
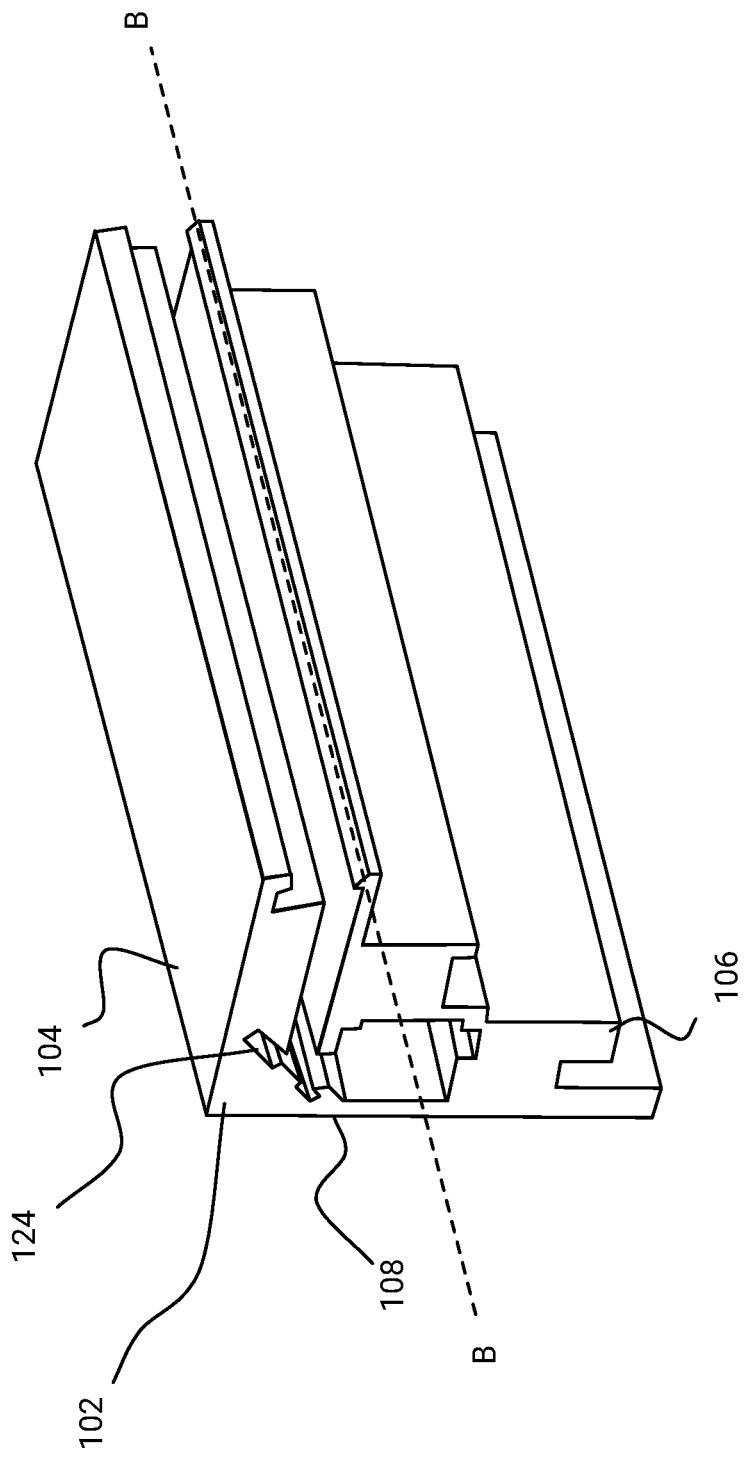
FIG. 3 shows a perspective view of an embodiment of an elongate frame.

FIG. 1 shows a cross-sectional side view of a touch-sensitive device 100 comprising an elongate frame 102. The elongate frame 102 extends around the periphery of the touch-sensitive device 100. The elongate frame 102 extends along a longitudinal axis B-B which extends into the page as shown in FIG. 1. A portion of the elongate frame 102 extending along the longitudinal axis B-B is shown in FIG. 3. FIG. 3 shows a perspective view of a portion of the elongate frame 102.

The elongate frame 102 comprises a top wall 104, a bottom wall 106 and a side wall 108 connected therebetween. The elongate frame 102 can comprises a plurality of surfaces defining voids for securing internal components. Indeed, the elongate frame 102 can comprise any suitable cross-sectional shape to accommodate different components and geometries. For example, the top wall 104, the bottom wall 106 and the side wall 108 can comprises multiple exterior surfaces 110. For the purposes of clarity only one of the multiple exterior surfaces 110 has been labelled. Each of the top wall 102, the side wall 108 and the bottom wall 106 and can comprise multiple interior and exterior surfaces.

FIG. 1 shows a cross-sectional side view through part of the periphery of the touch-sensitive device 100. For the purposes of clarity, not all the components and structure of the touch-sensitive device 100 are shown.

A light emitter component 112 is mounted on a substrate 114 such as a printed circuit board (PCB). For the purposes of clarity, a reciprocal light detector is not shown. However, the reciprocal light detector component is mounted on the substrate 114 adjacent to the light emitter component 112. As mentioned previously, the light emitter and light detector components are arranged on the substrate 114 along the periphery of the touch-sensitive device.

The substrate 114 is secured to the frame 102 by a first mounting 116. In some embodiments, the first mounting comprises at least one substrate mounting slot 116. The substrate mounting slot 116 is for receiving an edge of the substrate 114. In this way, the substrate 114 is slid into the substrate mounting slot 116 and the substrate 114 is held in place substrate mounting slot 116. In other embodiments, the first mounting 116 can be screws, glue, or any other suitable fixture for securing the substrate 114 to the frame 102. The substrate 114 is mounted in the frame 102 so that it extends in a plane which is substantially perpendicular to a touch surface 118. In this way, the touch surface 118 extends in a horizontal plane and the substrate 114 extends in a direction between the top wall 104 and the bottom wall 106. In alternative embodiments, (not shown), the substrate 114 can extend in a plane which is substantially parallel to the plane of the touch surface 118.

The touch surface 118 is mounted above the substrate 114 or adjacent to the substrate 114. The touch surface 118 in some embodiments is mounted to the elongate frame 102 in a second mounting 120 in the frame 102. The second mounting 120 as shown in FIG. 1 is a pair of perpendicular surfaces against which the touch surface 118 abuts.

Alternatively, or additionally, the second mounting 120 is a peripheral touch surface mounting slot (not shown) for receiving an edge 122 of the touch surface 118. The second mounting 120 extends around the entire peripheral edge 122 of the touch surface 118. Both the first and second mountings 116, 120 are integral with the frame 102. In this way, the frame 102 can be extruded using a die comprising the cross-sectional shape of the first and second mountings 116, 120. In some alternative embodiments, the second mounting 120 can additionally or alternatively be screws, glue, or any other suitable fixture for securing the touch surface 118 to the elongate frame 102.

In some embodiments, the elongate frame 102 comprises at least two separate parts (not shown). The separate parts of the elongate frame 102 are fastened together with screws, tape or any other suitable fastening. For example, in the light diffuser 128 is mounted in one part of the elongate frame 102 and the substrate 114 is mounted on the other part of the elongate frame 128.

Figure 2:
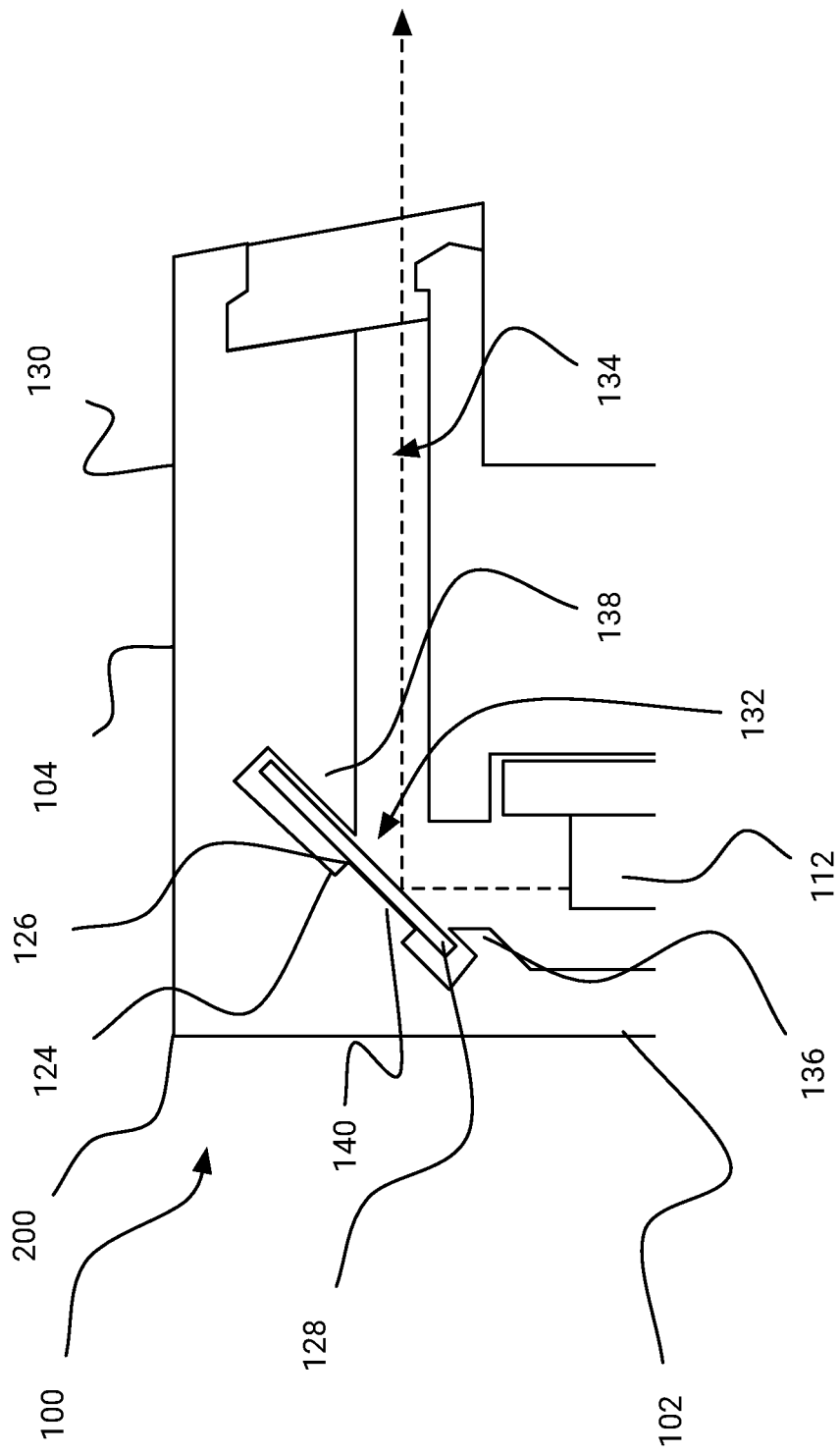
FIG. 2 shows a close-up cross-sectional side view of an embodiment of a touch-sensitive device.

The elongate frame 102 will now be discussed in more detail with respect to FIG. 2. FIG. 2 is a close-up cross-sectional side view of the embodiment shown in FIG. 1.

An optical component mounting slot 124 is located at the corner of the top wall 104 and the side wall 108 of the elongate frame 102. At least a portion of the optical component mounting slot 124 is above the first mounting 116 and the second mounting 120 for respectively fixing the at least one light emitter 112 and the touch surface 118. In some embodiments, the internal surface 126 of the optical component mounting slot 124 provides a mounting surface 126 for mounting an optical component 128. The mounting surface 126 is flat which keeps the optical component 128 flat in the embodiments when the light diffuser 128 is a flexible element. The optical component 128 will be described in further detail below.

In some embodiments, the optical component can be an optical component for modifying the properties of the emitted light incident on the optical component. In this case, the optical component can converge, diverge, reflect, or refract the incident light, or filter the light or modify a characteristic of the emitted light from the emitter 112 in any required way. In some embodiments, the optical component 128 is an optical film. In some embodiments, the optical component 128 is a light diffuser 128. Hereinafter the embodiments will refer to a light diffuser 128, but in other embodiments, the light diffuser 128 can be replaced with any other suitable optical component 128 for changing the characteristics of the emitted light incident on the optical component. Optical components are applied in the same way as described in reference to the light diffuser 128 in the embodiments below.

As shown in FIG. 2, the optical component slot 124, or light diffuser mounting slot 124 (as it will be referred to hereinafter) is an open slot comprising an opening 132 in communication with an internal space 134 of the elongate frame 102. The light diffuser mounting slot 124 extends in the longitudinal axis B-B of the elongate frame 102. Accordingly, the light diffuser 128 when mounted in the light diffuser mounting slot 124 is in line with the light emitter 112 and a position above the touch surface 118 as indicated by the dotted arrow in FIG. 1. Optionally, the mounting surface 126 is the same width as the opening 132.

The light diffuser mounting slot 124 comprises a first lip 136 and a second lip 138 for retaining the light diffuser 128 inserted into the light diffuser mounting slot 124. In this way the first lip 136 and the second lip 138 project over the edges of the light diffuser 128.

In some embodiments, the light diffuser mounting slot 124 optionally comprises an elongate ridge 140 for engaging with the light diffuser 128. Accordingly, the elongate ridge 140 urges the light diffuser 128 against the first and second lips 136, 138. In this way, the light diffuser 128 is held in place in the light diffuser mounting slot 124 with a friction fit. This means that the mounting surface 126 is the surface on top of the elongate ridge 140. In other embodiments, the light diffuser mounting slot 124 does not comprise an elongate ridge 140 and the mounting surface 126 is the flat internal surface of the light diffuser mounting slot 124.

Optionally, the elongate ridge 140 pushes against the light diffuser 128 to deform the light diffuser 128 (not shown). Optionally, the elongate ridge 140 pushes against the light diffuser 128 to cause the light diffuser 128 to have a convex cross-sectional shape.

Optionally, the frictional forces between elongate ridge 140 and the light diffuser 128 is dependent on the relative materials used on for the light diffuser 128 and the elongate frame 102 and e.g. the elongate ridge 140.

Figure 9:
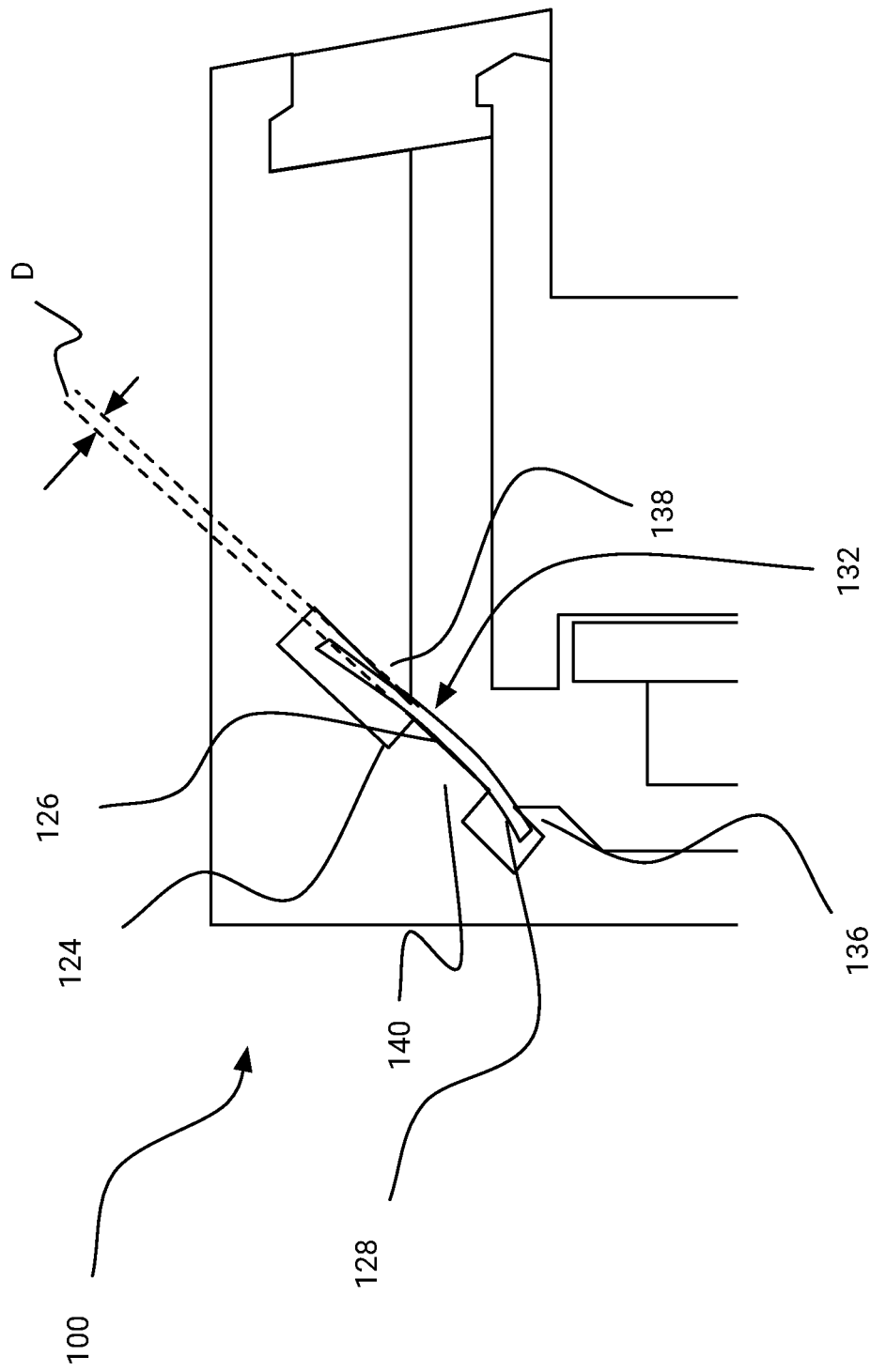
FIG. 9 shows a close-up cross-sectional side view of an embodiment of a touch-sensitive device.

Optionally, in some embodiments, the elongate ridge 140 is aligned opposite the opening 132 of the light diffuser mounting slot 124. Since the elongate frame 102 is extruded through a die, the minimum depth of a feature is approximately 1 mm. This means that the light diffuser mounting slot 124 cannot be less than 1 mm narrow when extruding the elongate frame 102. Accordingly, by providing an elongate ridge 140 opposite the opening 132 and protruding towards and/or into the opening 132, the light diffuser 128 having a thickness less than 1 mm can be held between the elongate ridge 140 and the first and second lips 136, 138. In some embodiments as shown in FIG. 9, the separation D between the elongate ridge 140 and the first or the second lip 136, 138 in a direction perpendicular to the mounting surface 126 is less than 1 mm. In some embodiments, the separation D is equal to or less than the thickness of the light diffuser film 128. For example, the separation D is equal to or less than 0.3 mm, or 0.2 mm depending on whether the light diffuser film 128 comprises a backing layer or not. In some embodiments, the elongate ridge 140 extends out of the opening 132 beyond the first and the second lips 136, 138. Accordingly, if the light diffuser 128 is a flexible film 128, the light diffuser film 128 will bend around the elongate ridge 140 and the first and second lips 136, 138 as shown in FIG. 9. This means that the light diffuser film 128 will maintain a convex shape when mounted in the light diffuser mounting slot 124.

In other embodiments, the elongate ridge 140 is not required, for example, the light diffuser 128 has a thickness greater than 1 mm or is not a flexible film.

Additionally, there can be a plurality of elongate ridges (not shown) for urging the light diffuser 128 against the first and second lips 136, 138.

In other embodiments, the mounting surface 126 can be a separate component (not shown) inserted into the light diffuser mounting slot 124. In this way, the mounting surface element is inserted into the light diffuser mounting slot 124 together with the light diffuser 128.

Advantageously, by providing an integral mounting surface 126 which is part of the frame 102, the height H that the bezel 130 of the touch-sensitive device 100 protrudes above the touch surface 118 is reduced. This is because a bulky, separate diffusion component does not need to be secured to the elongate frame 102.

The light diffuser mounting slot 124 is aligned with the light emitter 112 for receiving and diffusing light over the touch surface 118. In this way, light emitted from the light emitter component 112 is incident on the light diffuser 128.

In order to promote the effective diffusion of light over the touch surface 118, the light diffuser mounting slot 124 and the light diffuser 128 are angled with respect to a plane A-A of the touch surface 118. In some embodiments, the angle of the light diffuser mounting slot 124 and/or the light diffuser 128 with respect to the plane A-A of the touch surface 118 is between 40-60 degrees.

In some embodiments, the angle of the light diffuser mounting slot 124 and/or the light diffuser 128 with respect to the plane A-A of the touch surface 118 is 45 degrees. In other embodiments, the angle can be varied depending on the diffusion properties (e.g. geometry, material, surface pattern) of the surface of the light diffuser 128. In some embodiments, the light diffuser 128 comprises a light diffusing surface which diffuses the incident emitted light across the touch surface 118.

In some embodiments, the light diffuser 128 is a flexible elongate strip of light diffusing material. In some embodiments, the light diffusing material is a light diffusing film 128. The light diffusing film 128 optionally comprises an adhesive backing (not shown) for adhering the light diffusing film 128 to the mounting surface 126. In some embodiments, fresh, unused light diffusive film 128 comprises a backing liner for covering the adhesive backing until application of the light diffusing film 128 to the mounting surface 126. Optionally, the light diffusing film can be mounted in the light diffuser mounting slot 124 whilst still comprising the backing liner because the light diffusing film 128 is held in place in the slot between the elongate ridge 140 and the first and second lips 136, 138.

In some embodiments, the light diffusing film 128 does not comprise a backing liner. In this case, the light diffusing film 128 comprises a tactile adhesive that is activated under pressure. This means that the light diffusing film 128 does not adhere to itself when stored. In other embodiments, the light diffusing film 128 does not comprise an adhesive backing. In this case, an adhesive is applied to the mounting surface 126 before the light diffusing film 128 is mounted on the mounting surface 126.

In some embodiments, the light diffusing film 128 comprises a width of 3.30 mm. In some embodiments, the width of the light diffusing film 128 is the same as the width of the mounting surface 126 (not shown). In other embodiments, the width of the light diffusing film 128 is greater that the width of the mounting surface 126 on the elongate ridge 140. Indeed, by providing a width greater than the elongate ridge 140, the edges of the light diffusing film 128 are held in place by the first and second lips 136, 138 optionally without adhesive.

In some embodiments, the light diffuser mounting slot 124 is slightly wider than the width of the light diffusing film 128 in order that the light diffusing film 128 can be freely fed into the light diffuser mounting slot 124.

In this way, when the light diffusing film 128 is applied to the mounting surface 126, the light diffusing film 128 covers at least a portion of light diffuser mounting slot 124 which is exposed by the slot opening 132.

The thickness of the light diffusing film 128 with the backing liner is approximately 0.30 mm. The thickness of the light diffusing film 128 without the backing liner is approximately 0.20 mm and the thickness of the backing liner is approximately 0.1 mm. In other embodiments the width and the thickness of the light diffusing film 128 are varied. The light diffusing film 128 is flexible and is storable in a roll. This means that the length of the light diffusing film 128 can be any suitable length to match the length of the elongate frame 102. Advantageously, this means that the light diffusing film 128 can be dispensed and cut with a knife to match the length of the elongate frame 102.

Application of the light diffuser 128 to the elongate frame 102 will now be described with respect to FIGS. 4 to 8. FIGS. 4 to 8 show perspective views of the elongate frame and a tool 400 for applying the light diffuser 128 to the elongate frame 102.

Figure 4:
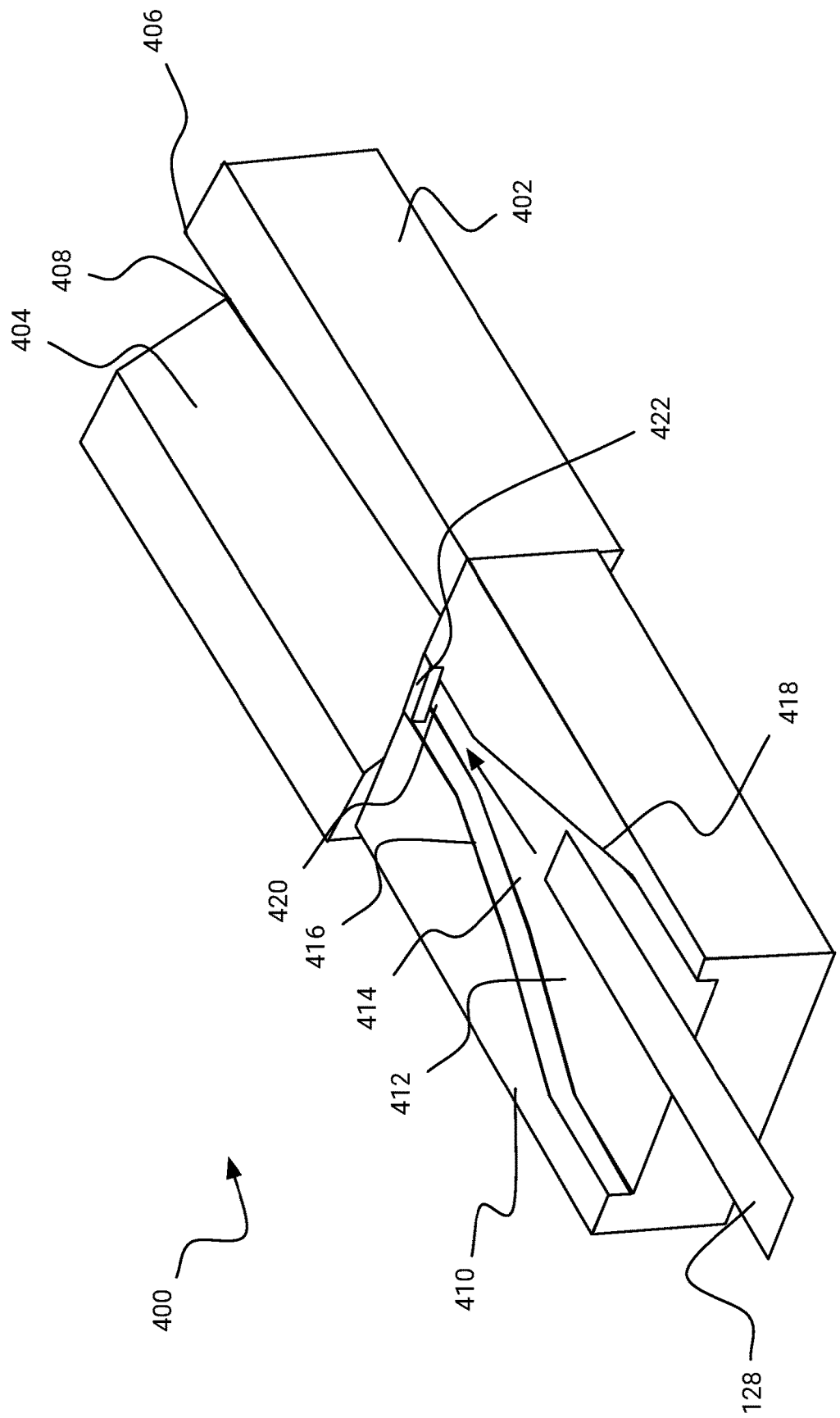
FIG. 4 shows a perspective view of a tool according to an embodiment.

Turning to FIG. 4, a light diffuser application tool 400 for applying the light diffuser 128 to the elongate frame 102 will now be described in further detail.

Figure 5:
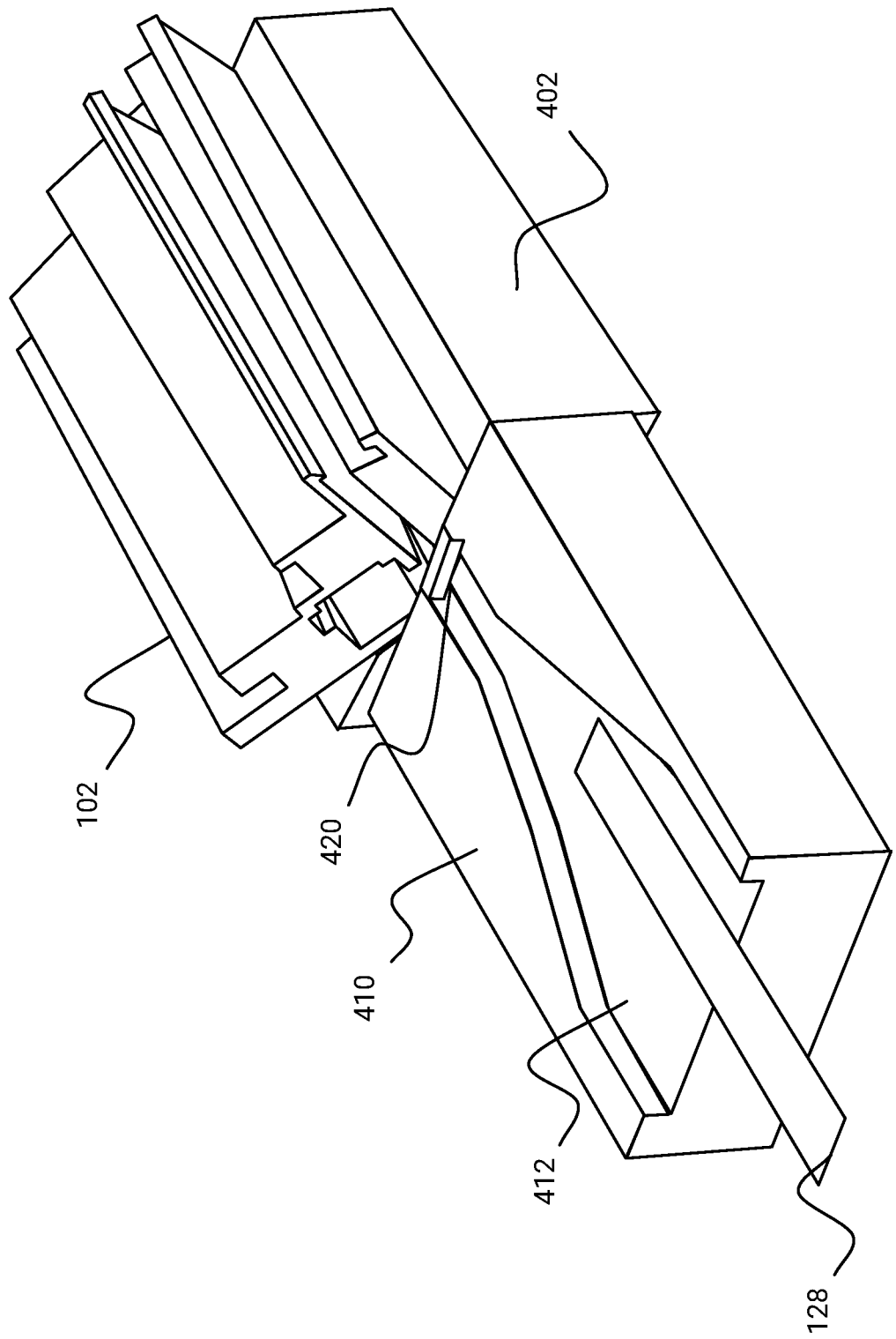
FIG. 5 shows a perspective view of an embodiment an elongate frame engaged with a tool.
Figure 6:
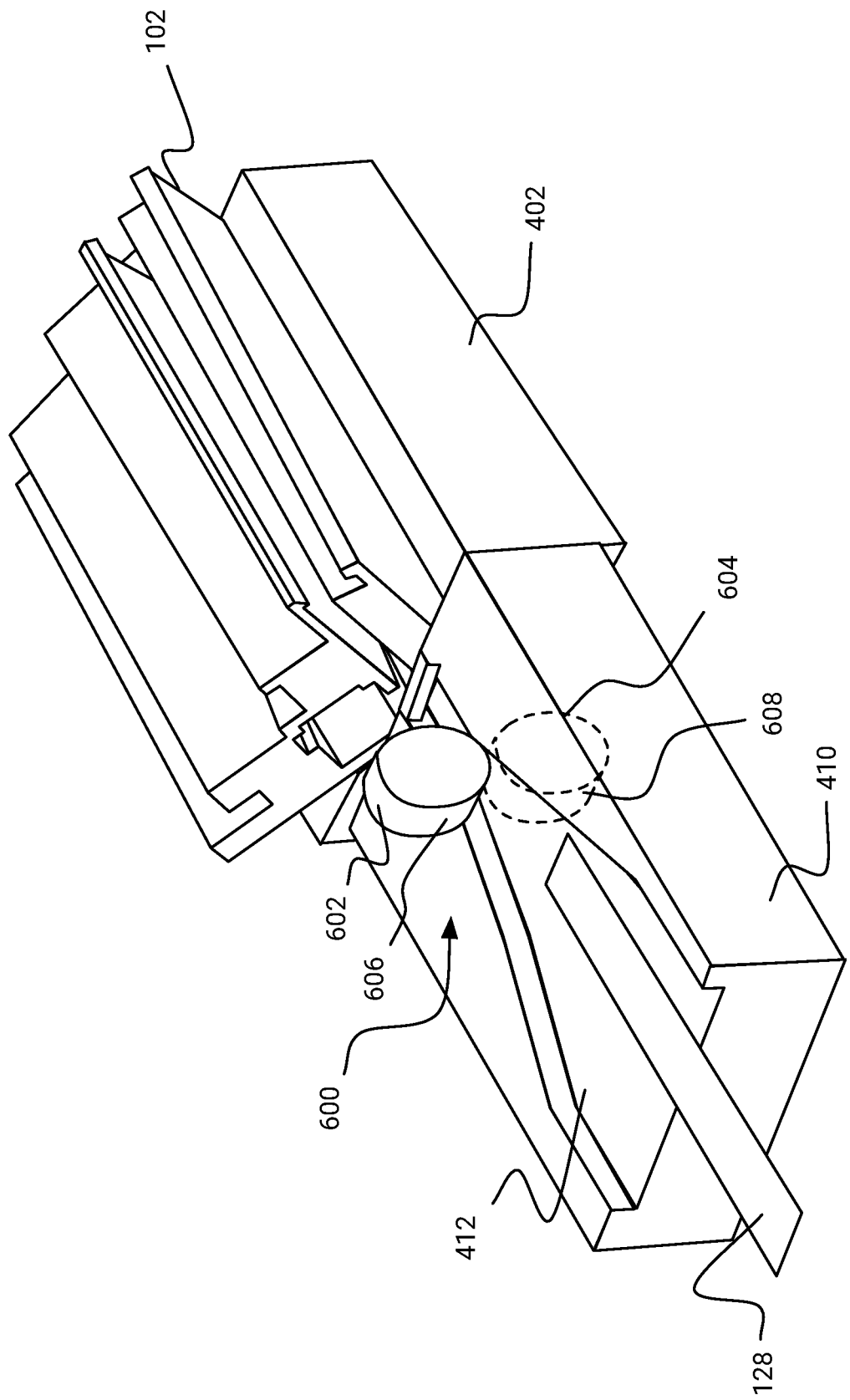
FIG. 6 shows a perspective view of an embodiment an elongate frame engaged with a tool.

For the purposes of clarity, the tool 400 as shown in FIG. 4 does not show the elongate frame 102. However, FIGS. 5 and 6 show the elongate frame 102 mounted in the tool 400.

The tool 400 comprises a jig 402 engageable with the elongate frame 102. The jig 402 comprises at least one reference surface 404 for aligning the elongate frame 102 in a predetermined position. In some embodiments, the jig 402, comprises first and second reference surfaces 404, 406 for engaging with the outer surface of the top wall 104 and the outer surface of the side wall 106. In this way, the vertex 200 defined by the surface of the top wall 104 and the surface side wall 106 is aligned with a reciprocal vertex 408 defined by the first and second reference surfaces 404, 406.

Whilst the jig 402 as shown in FIG. 4 uses the vertices 200 and 408 to align the elongate frame 102 in the jig 402, any surface on the elongate frame 102 can be used to position a reference surface of a jig 402. Indeed, the jig 402 can be any suitable shape or size reciprocal to the elongate frame 102. The jig 402 as shown in FIG. 4 is of a length which is reciprocal to a length of the elongate frame 102 as shown in FIG. 3. Accordingly, the jig 402 can be any suitable length to accommodate the length of the elongate frame 102.

The tool 400 comprises a light diffuser feeder 410 for receiving a light diffuser 128. The light diffuser feeder 410 comprises a feeding surface 412 for positioning and aligning the light diffuser 128 with respect to the jig 402. As can be seen from the FIG. 4, the light diffuser 128 is positioned on the feeding surface 412. The light diffuser feeder 410 comprises a channel 414 with channel walls 416, 418 for constraining the side to side position of the light diffuser 128 on the feeding surface 412. The channel 414 narrows to a feeding mouth 420. The feeding mouth 420 is configured to receive the light diffuser 128 and position the light diffuser 128 in a side to side direction. The feeding mouth 420 comprises a bridge portion 422 for preventing movement of the light diffuser 128 in a vertical direction.

Turning to FIG. 5, the elongate frame 102 is mounted in the jig 402. The elongate frame 102 has been inverted such that the vertex 200 is inserted into the jig 402. Accordingly, the top wall 104 and the side wall 106 are engaged with the first and second reference surfaces 404, 406. When the elongate frame 102 engages the jig 402, the light diffuser mounting slot 124 is aligned with the feeding mouth 420. In some embodiments, the feeding surface 412 is in the same plane as the light diffuser mounting slot 124. This means that when the light diffuser 128 is fed in to the feeding mouth 420 in the direction of the arrow shown in FIG. 4, the light diffuser 128 is pushed into the light diffuser mounting slot 124.

Optionally, the elongate frame 102 is clamped to the jig 402 so that the elongate frame 102 is fixed with respect to the jig 402 during the application of the light diffuser 128 to the elongate frame 102.

In some embodiments, the user then manually pushes the light diffuser 128 with their finger. In this way, the user feeds the light diffuser 128 into the light diffuser mounting slot 124.

The jig 402 and the light diffuser feeder 410 are shown in FIGS. 4 and 5 as separate elements. The jig and the light diffuser feeder 410 are fixed with respect to each other so that the feeding surface 412 is positioned with respect to the first and second reference surfaces 404, 406.

In some embodiments, the jig 402 and the light diffuser feeder 410 are integral and a single element. In other embodiments, the light diffuser feeder 410 and the jig 402 are separable. Accordingly, different light diffuser feeders 410 are interchangeable with other jigs 402. This means that the jig 402 and the light diffuser feeder 410 can be configured for different size and shape light diffusers 128 and different sizes, shapes and orientations of the elongate frame 102.

Turning to FIG. 6, another embodiment will now be described. FIG. 6 shows a perspective view of an elongate frame 102 mounted in a light diffuser application tool 400 for applying the light diffuser 128. FIG. 6 is the same as the embodiment as shown in FIG. 5 except that the light diffuser feeder 410 comprises a feeding mechanism 600 for feeding the light diffuser 128 into the light diffuser mounting slot 124.

The feeding mechanism 600 comprises a first roller 602 and a second roller 604. The first and second rollers 602, 604 are rotatably mounted on the light diffuser feeder 410. For the purposes of clarity, the mounting frame for the first and second rollers 602, 604 are not shown. One or both of the first and second rollers 602, 604 are mounted on a drive shaft of an electric motor (not shown).

The first roller 602 is mounted above the feeding surface 412 and the second roller 604 is mounted below the feeding surface 412. In some embodiments, the rolling surfaces 606, 608 intersect with the feeding surface 412. In this way, when the light diffuser 128 is inserted between the first and second rollers 602, 604, the first and second rollers 602, 604 engage the top and bottom surfaces of the light diffuser 128 and the light diffuser 128 is urged by the rollers 602, 604 towards the jig 402. The light diffuser 128 is then fed into the light diffuser mounting slot 124.

In another embodiment, there is only one roller 602 for urging the light diffuser 128 into the light diffuser mounting slot 124. For example, only the first roller 602 mounted above the feeding surface 412 is provided.

The one or two rollers 602, 604 grip the surface of the light diffuser 128 and push the light diffuser 128 into the light diffuser mounting slot 124. In some embodiments, the coefficient of friction of the rollers 602, 604 is higher than the coefficient of friction of the surface of the elongate frame 102. Accordingly, when the light diffuser 128 is fed into the light diffuser mounting slot 124, the rollers 602, 604 can continue to push the light diffuser 128 all the way through the light diffuser mounting slot 124.

In other embodiments, the feeding mechanism 600 can be any other suitable mechanism for pushing the light diffuser 128 into the light diffuser mounting slot 124. For example, the feeding mechanism 600 can comprise a rubber stopper mounted at the end of a reciprocating linkage (not shown) which stepwise pushes the light diffuser 128 into the light diffuser mounting slot 124.

Figure 7:
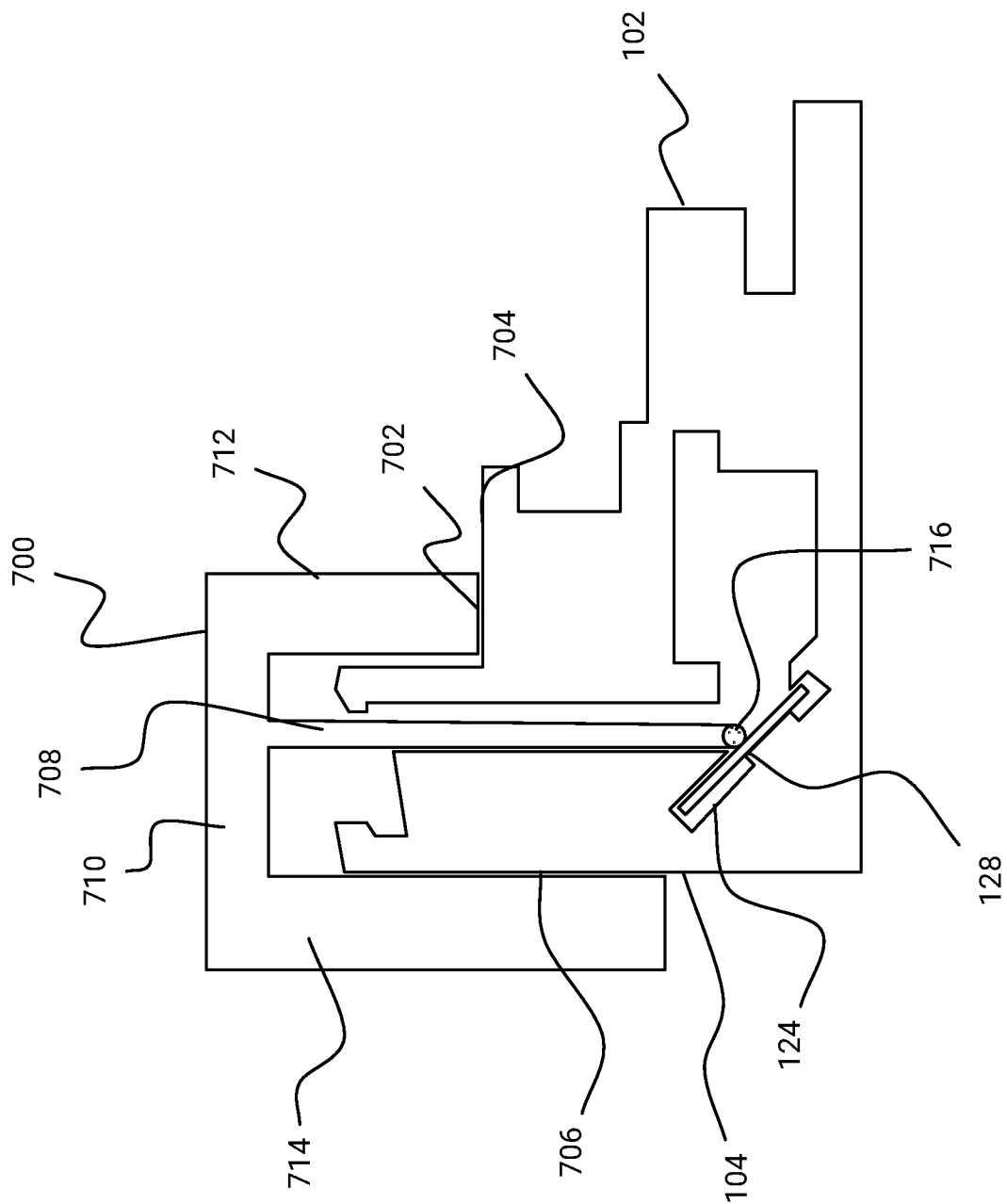
FIG. 7 show a cross-sectional side view of an embodiment of the elongate frame and tool.

Another embodiment will now be described with reference to FIG. 7. FIG. 7 shows another light diffuser application tool 700 for feeding the light diffuser 128 into the light diffuser mounting slot 124. The tool 700 is arranged to move relative to the elongate frame 102 and feed the light diffuser 128 into the light diffuser mounting slot 124 by pulling the light diffuser 128 though the light diffuser mounting slot 124.

The tool 700 comprises a body 710 having first and second projecting arms 712, 714. The first projecting arm 712 comprises a first reference surface 702 to engage the side 704 of the elongate frame 102. The second projecting arm 714 comprises a second reference surface 706 for engaging the top wall 104 of the elongate frame. The first and second reference surfaces 702, 706 maintained the relative position of the tool 700 with respect to the light diffuser mounting slot 124 as the tool 700 moves with respect to the elongate frame 102. In some embodiments, the first and second reference surfaces 702, 704 are in orthogonal planes to limit the relative movement of the tool 700 with respect to the elongate frame 102 only along the longitudinal axis B-B of the elongate frame 102.

The tool 700 is arranged to move in a direction parallel to the longitudinal axis B-B of the elongate frame 102 as shown in FIG. 3.

The body 710 of the tool 700 comprises a light diffuser feeder arm 708 which projects from the body 710. The light diffuser feeder arm 708 is configured to protrude into the internal space 134 of the elongate frame 102 and into the light diffuser mounting slot 124. The light diffuser feeder arm 708 comprises a gripper 716 which grips an end of the light diffuser 128 to the light diffuser feeder arm 708. In some embodiments, the gripper 716 is a double-sided adhesive or a soft gasket. Alternatively, the gripper 716 is a fastening such as a clip, clamp, screw, pin, eye, glue or any other suitable means for fixing the light diffuser feeding arm 708 to the light diffuser 128.

In this way, when the tool 700 moves with respect to the elongate frame 102, the light diffuser 128 also moves with respect to the elongate frame 102. In this way, once the light diffuser feeding arm 708 is fixed to the end of the light diffuser 128, the tool 700 is threaded into one end of the elongate frame 102. At the same time, the light diffuser 128 is manually fed into the light diffuser mounting slot 124 by about 10 mm. The tool 700 is then slid along the longitudinal axis B-B of the elongate frame 102 and the light diffuser 128 is pulled through and fed into the light diffuser mounting slot 124.

In some alternative embodiments, the tool 700 can be fixed and the elongate frame 102 is moved relative to the tool 700.

Figure 8:
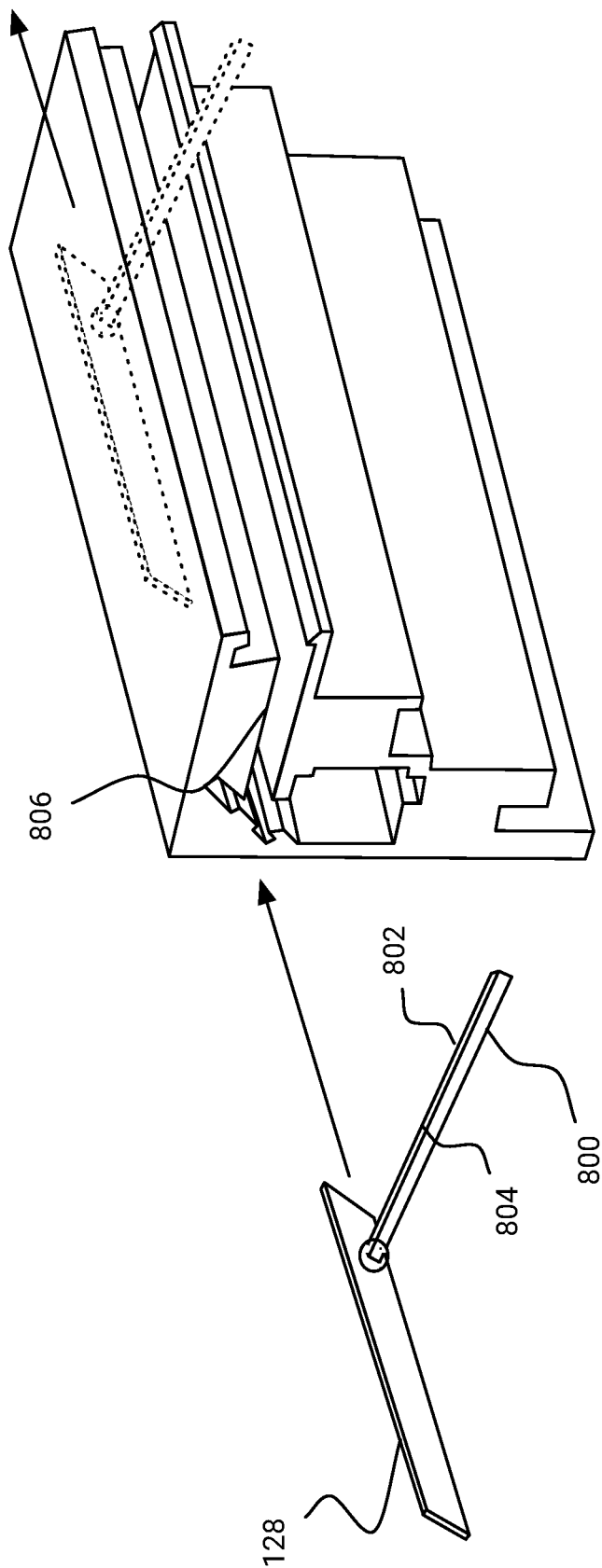
FIG. 8 shows a perspective view of an embodiment of the elongate frame and tool.

Another light diffuser application tool 800 will now be described in reference to FIG. 8. FIG. 8 shows a perspective view of the elongate frame 102 with a light diffuser application tool 800. The elongate frame 102 is the same as previously discussed in reference to the previous embodiments.

The light diffuser application tool 800 comprises a light diffusing feeding arm 802 which is mounted to the end of the light diffuser 128. The light diffusing feeding arm 802 comprises a reference surface 804 for engaging with one or more internal surfaces 806 of the elongate frame 102. In this way, the light diffusing feeding arm 802 also comprises the reference surface 804. The light diffuser 128 is inserted manually into the light diffuser mounting slot 124 by about 10 mm. The light diffusing feeding arm 802 then projects out of the internal space 134 which the user can grip and pull.

The light diffuser 128 is then pulled through the light diffuser mounting slot 124 as described with reference to the embodiments shown in FIG. 7.

In some embodiments, the light diffusing feeding arm 802 is fastened to the light diffuser 128 with adhesive. In other embodiments, the light diffusing feeding arm 802 is fastened to the light diffuser 128 with any suitable means such as a clip, clamp, screw, pin, eye, glue etc.

In some embodiments, the light diffusing feeding arm 802 can be rigid or flexible. For example, the light diffuser 128 is fixed to a pull tab or a thread for pulling the light diffuser 128 through the light diffuser mounting slot 124.

In another embodiment two or more embodiments are combined. Features of one embodiment can be combined with features of other embodiments.

Embodiments of the present invention have been discussed with particular reference to the examples illustrated. However, it will be appreciated that variations and modifications may be made to the examples described within the scope of the invention.

The invention claimed is:

1. An elongate frame for a touch-sensitive device comprising:
   a bottom wall, a top wall and a side wall connected therebetween;
   a first mounting and a second mounting for respectively fixing at least one light emitter and a touch surface with respect to the frame; and
   a slot at least partially positioned above the second mounting and the first mounting wherein the slot is arranged to receive an optical component,
   wherein the slot is angled with respect to the side wall and the top wall such that light emitted from the emitter is diffused above the touch surface when incident on the optical component.

2. An elongate frame according to claim 1, wherein the optical component is a light diffuser.

3. An elongate frame according to claim 1, wherein the slot is angled with respect to a plane of the touch surface when mounted in the second mounting.

4. An elongate frame according to claim 1, wherein the slot comprises a first lip and a second lip arranged to retain edges of the optical component.

5. An elongate frame according to claim 4, wherein the slot comprises a ridge for urging the optical component against the first and second lips.

6. An elongate frame according to claim 1, wherein the optical component comprises an elongate planar shape.

7. An elongate frame according to claim 1, wherein the optical component is a light diffusing film.

8. A touch-sensitive device comprising:
   a touch surface;
   at least one light emitter;
   a frame according to claim 1; and
   an optical component mounted in the slot.

9. An optical component application tool for an elongate frame of touch-sensitive device wherein the elongate frame comprises a slot arranged to receive an optical component, the optical component application tool comprising:
   at least one reference surface engageable with at least a portion of the elongate frame such the slot is located in a predetermined position with respect to the at least one reference surface; and
   an optical component feeder aligned with respect to the at least one reference surface wherein the optical component feeder is arranged to feed the optical component into the slot, wherein the optical component feeder comprises at least one roller engageable with the optical component.

10. An optical component application tool according to claim 9, wherein the tool comprises a feeding surface engageable with the optical component and the feeding surface is alignable with the slot when the elongate frame is engaged with the at least one reference surface.

11. An optical component application tool according to claim 9, wherein the optical component pushes the optical component into the slot.

12. An optical component application tool according to claim 9, wherein the optical component is positioned between at least one roller and the feeding surface.

13. An optical component application tool according to claim 12, wherein the at least one roller comprises two rollers and the optical component is feedable between the two rollers.

14. An optical component application tool according to claim 9, wherein the optical component feeder pulls the optical component into the slot.

15. An optical component application tool according to claim 14, wherein the optical component feeder is fixed to the optical component.

16. An optical component application tool according to claim 9, wherein the optical component application tool is moveable along a longitudinal axis of the elongate frame.

17. An optical component application tool according to claim 16, comprising at least one coupling to prevent relative movement of the optical component application tool in a plane perpendicular to the longitudinal axis of the elongate frame.

18. An optical component application tool according to claim 17, wherein the at least one coupling comprises an interior coupling portion having a reciprocal shape to a cross-sectional shape of the elongate frame.

19. An optical component application tool according to claim 16, wherein the optical component is a light diffuser.

20. A method of applying an optical component to an elongate frame of touch-sensitive device wherein the elongate frame comprises a slot arranged to receive the optical component comprising:
- engaging at least one reference surface with at least a portion of the elongate frame such the slot is located in a predetermined position with respect to the at least one reference surface; and
- feeding the optical component into the slot with an optical component feeder aligned with respect to the at least one reference surface;
- wherein the optical component feeder comprises at least one roller engageable with the optical component.

* * * * *